United States Patent
Nickerson et al.

(10) Patent No.: US 8,739,963 B2
(45) Date of Patent: Jun. 3, 2014

(54) SCREW-TYPE HEAT-EXCHANGER SYSTEM WITH VARIABLE-CLOCKING SCREW CONVEYORS

(75) Inventors: Robert Nickerson, Benicia, CA (US); John Whitney, El Dorado, AZ (US)

(73) Assignee: Therma-Flite, Inc., Benicia, CA (US)

( * ) Notice: Subject to any disclaimer, the term of this patent is extended or adjusted under 35 U.S.C. 154(b) by 0 days.

(21) Appl. No.: 13/372,045

(22) Filed: Feb. 13, 2012

(65) Prior Publication Data

US 2012/0205219 A1 Aug. 16, 2012

Related U.S. Application Data

(60) Provisional application No. 61/441,886, filed on Feb. 11, 2011.

(51) Int. Cl.
*B65G 15/14* (2006.01)

(52) U.S. Cl.
USPC .......................................... 198/604; 414/310

(58) Field of Classification Search
None
See application file for complete search history.

(56) References Cited

U.S. PATENT DOCUMENTS

| | | | |
|---|---|---|---|
| 2,731,241 A | 9/1955 | Christian | |
| 2,788,196 A | 4/1957 | Jacobi et al. | |
| 2,951,693 A | 9/1960 | Carothers | |
| 2,999,398 A | 9/1961 | Christian | |
| 3,398,676 A | 8/1968 | Theobald et al. | |
| 3,471,366 A * | 10/1969 | Reinhall | 162/237 |
| 3,549,000 A * | 12/1970 | Christian et al. | 198/659 |
| 3,580,389 A | 5/1971 | Nonnenmacher | |
| 3,779,522 A | 12/1973 | Loomans | |
| 4,078,653 A | 3/1978 | Suter | |
| 4,349,324 A * | 9/1982 | Neff et al. | 425/149 |
| 5,417,492 A | 5/1995 | Christian et al. | |
| 5,624,699 A * | 4/1997 | Lang | 426/425 |
| 7,185,558 B2 | 3/2007 | Murin | |
| 7,455,613 B2 | 11/2008 | Genter et al. | |
| 2005/0197241 A1* | 9/2005 | Hensley et al. | 494/57 |
| 2005/0238549 A1* | 10/2005 | Hammel | 422/168 |
| 2006/0118980 A1* | 6/2006 | Yamada et al. | 264/28 |
| 2009/0105059 A1* | 4/2009 | Dorry et al. | 494/37 |
| 2010/0143523 A1 | 6/2010 | Chang | |

* cited by examiner

*Primary Examiner* — Ramya Burgess
*Assistant Examiner* — Lester Rushin
(74) *Attorney, Agent, or Firm* — Lando & Anastasi, LLP

(57) ABSTRACT

A system for treating a material includes first and second screw conveyors each having a rotary shaft and a helical flight extending radially outward therefrom, the flighting of the screw conveyors overlapping with each other, and first and second actuators operably coupled to the first and second screw conveyors in a one-to-one dedicated relationship to rotationally drive the screw conveyors independently of each other. In typical embodiments, also included is a system for varying the clocking position of the screw conveyors relative to each other, wherein the screw conveyor flights are axially adjusted with respect to each other between a normal position and an advanced and/or retarded position. Also disclosed are methods of varying the axial position of the screw conveyor flights with respect to each other between the normal and advanced and/or retarded positions.

23 Claims, 12 Drawing Sheets

SCREW-TYPE HEAT-EXCHANGER SYSTEM WITH VARIABLE-CLOCKING SCREW CONVEYORS

CROSS-REFERENCE TO RELATED APPLICATION

This application claims the priority benefit of U.S. Provisional Patent Application Ser. No. 61/441,886, filed Feb. 11, 2011, which is hereby incorporated herein by reference.

TECHNICAL FIELD

The present invention relates generally to screw conveyors for conveying a material and transferring heat relative to the conveyed material, and, in particular, to such screw conveyors with variable-clocking controls.

BACKGROUND

Conventional screw-type heat-exchanger systems typically include multiple rotary screw conveyors arranged in parallel (with co-planar axes) with overlapping flights. These heat-exchanger systems are commonly used for heating (or cooling) and conveying (and sometimes mixing) non-flowable solid materials and flowable materials such as a slurry (a thick mixture of a solid suspended in a liquid), another heterogeneous material, or a bulk solid/commodity. In such heat-exchanger systems, the heat-exchange surfaces of the helical flights and the screw shafts contact and exchange heat with the material being processed.

Because each screw conveyor in the system has helical flights that overlap with the helical flights of an adjacent screw, the screw conveyors must be operated in a coordinated manner. That is, the rotational position of each screw (and thus the axial position of its flighting) must coordinated relative to the rotational position of each adjacent overlapping screw (and thus the axial position of its flighting), a feature known as clocking. If one screw were operated independently of the other, without clocking, its flighting would eventually interfere/collide with the flighting of the adjacent screw. In large heat-exchanger systems, such a collision can result in a catastrophic failure.

To provide this clocking feature, traditional multi-screw heat-exchanger systems include bull gears, with the flights of adjacent screws in a fixed axial relationship (fixed clocking). A drive system rotationally drives one of the screws directly, and the bull gears transmit the power from the directly driven screw to the other/non-directly driven screw (or screws) so that both screws rotate at the same constant speed.

FIGS. 1-3 show one such prior-art multi-screw heat-exchanger system 10 with fixed clocking. The system 10 includes two screw conveyors (a directly driven screw 20a and a non-directly driven screw 20b, collectively "the screw conveyors 20"), a screw-mounting assembly 30 for each screw, a screw-drive assembly 40 for driving the screws, and a control system 50 for operating the screw-drive assembly. The screw conveyors 20 each include a rotary shaft 22 with a helical flight 24 extending radially outward from the shaft so that the flights overlap with each other. The screw-mounting assemblies 30 include, at the head end of each screw 20, a rotary drive shaft 32 extending axially from the respective screw shaft 22 and two rotary bearing pairs 34 mounted on that drive shaft. The screw-mounting assembly 30 also includes, at the tail end of each screw 20, a rotary drive shaft (not shown) extending axially from the respective screw shaft 22 and one rotary bearing pair (not shown) mounted on that drive shaft. The screw-drive assembly 40 includes, for driving the directly driven screw 20a, a gear-motor 42, drive and driven sprockets 44 operably coupling the gear-motor to the drive shaft 32, and a chain 43 operably coupling the sprockets together. The screw-drive assembly 40 also includes, for driving the non-directly driven screw 20b, a bull gear 45 that is mounted on and rotational with each drive shaft 32 and that is positioned between the respective bearing pairs 34, with the bull gear on the directly driven screw 20a in meshing engagement and driving the bull gear on the non-directly driven screw 20b. And the control system 50 includes conventional controls for operating the gear-motor 42 to drive the screws 20 at a constant speed.

Additional details of screw-type heat-exchanger systems are disclosed in U.S. Pat. No. 5,417,492, issued May 23, 1995; U.S. Patent Application Pub. No. US2008/0295356, published Dec. 4, 2008 (U.S. Non-Provisional patent application Ser. No. 12/156,681, filed Jun. 2, 2008); and U.S. Patent Application Pub. No. US2010/0051233, published Mar. 4, 2010 (U.S. Non-Provisional patent application Ser. No. 12/552,369, filed Sep. 2, 2009), all of which are hereby incorporated by reference herein.

The bull gears traditionally used for timing/clocking of the screws each have two bearings on the screw shaft, one on each side of them, and these bearings must be assembled in precise alignment with a tail bearing on the other (non-directly driven) end of the screw. When the heat-exchanger system is assembled, the relative position of the screws (i.e., the clocking) is set by precisely keying the bull gears to the screw shafts. Any subsequent maintenance adjustment requires dismounting at least one of the gears, rotating the respective screw to the desired position, and remounting the respective bull gear. Since the driving force for the non-directly driven screw is transmitted through the bull gears, and the screws are typically very large and heavy, the bull gears are necessarily very large and heavy. Precise field re-alignment of such large and heavy gears and bearings can be extremely difficult and time-consuming.

In addition, because each screw has a bull gear, and because adjacent meshing bull gears rotate in opposite angular directions, the screws of two-screw systems counter-rotate with respect to each other (that is, they rotate in opposite angular directions). In systems with more than two screws, adjacent screw pairs (with one driving the other) rotate in opposite angular directions. This counter-rotation of adjacent screws produces relatively little mixing action of the material being processed.

Furthermore, multiple overlapping screw conveyors are typically used in these applications because they can usually move the material satisfactorily, even if the screw conveyers are significantly inclined upward from input (head) to output (tail) ends, as long as the material is not extremely flowable. However, if the material is a heterogeneous mixture of, for example, fibrous materials and fine powders, the fibrous material can segregate and accumulate in the screw conveyers, while the more conveyable granular material is rapidly discharged from them. In addition, for maximum heat-exchange capacity and efficiency, the heat-exchange surfaces must be directly and completely (or substantially so) covered with the material. But if the material is sticky, doughy, or otherwise non-flowable, or undergoes a phase change in which it becomes so, the material can build up and bake onto the heat-transfer surfaces of the flighting such that it significantly reduces heat-transfer efficiency. And such sticky and plastic material can fill the inter-flight voids defined by adjacent screws and form a log of material that rotates with the flights with very little axial motion. Furthermore, very free-flowing materials can flow backwards if installed on upwardly inclined screw conveyors, or such materials can outrun the flighting of downwardly inclined screw conveyors and flow out the outlet end thereby leaving the top part of the screws unused as heat exchange area. Moreover, some materials (e.g., biomass cells) tend to form into chunks or clods with wet centers and dried crusts that prevent the drying of the encrusted wet material, and this problem is traditionally managed by recycling fifty percent of the cloddy material back through the equipment, thereby increasing the size, complexity, and energy requirements of the screw-conveyor system.

One known prior system that attempts to overcome some of these problems includes a set of eccentric bull gears that cause the screw flights to counter-rotate (only) and to advance and retard axially relative to each other during each screw revolution in an attempt to clean the material accumulation from the flights for improved heat-transfer efficiency. This system provides a constantly varying clocking during each revolution, but cannot adjust the clocking to a specific fixed position or adjust the clocking over more than one revolution, and the maintenance problems relating to bull gears remains.

Another such known prior system includes chains and sprockets (with idler sprockets for tensioning and positioning to produce adequate "rap" on the primary sprockets) for co-rotating the screws in the same direction and providing the needed clocking. This co-rotating screw arrangement tends to provide for increased mixing action of the material being processed. With co-rotation, the mixing is enhanced because the travel length of the material in the flight overlap area is increased due to the overlapped flight sections approaching each other from, and withdrawing from each other in, opposite angular directions. In addition, this design does not include the bull gears or their bearings for clocking. However, these systems provide only fixed clocking and they suffer from the same maintenance problems as with systems with bull gears (because they have the same three-bearing design for the sprockets and also require additional bearings for the idlers.

Accordingly, it can be seen that needs exist for improvements to multi-screw heat-exchanger systems and/or drive control systems for them. It is to the provision of solutions to this and other problems that the present invention is primarily directed.

SUMMARY

Generally described, the present invention relates to a system for treating a material includes first and second screw conveyors each having a rotary shaft and a helical flight extending radially outward therefrom, the flighting of the screw conveyors overlapping with each other, and first and second actuators operably coupled to the first and second screw conveyors in a one-to-one dedicated relationship to rotationally drive the screw conveyors independently of each other. In typical embodiments, also included is a system for varying the clocking position of the screw conveyors relative to each other, wherein the screw conveyor flights are axially adjusted with respect to each other between a normal position and an advanced and/or retarded position. Also disclosed are methods of varying the axial position of the screw conveyor flights with respect to each other between the normal and advanced and/or retarded positions.

The specific techniques and structures employed by the invention to improve over the drawbacks of the prior devices and accomplish the advantages described herein will become apparent from the following detailed description of the example embodiments of the invention and the appended drawings and claims.

DETAILED DESCRIPTION OF EXAMPLE EMBODIMENTS

Figure 1:
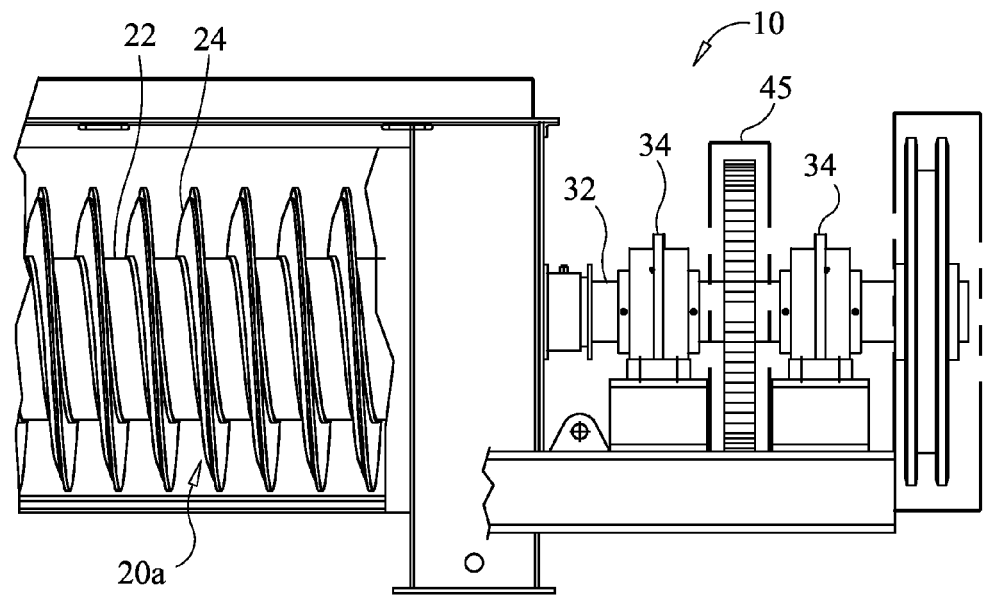
FIG. 1 is a side view of a drive-end portion of a multi-screw heat-exchanger conveyor system according to the prior art.
Figure 2:
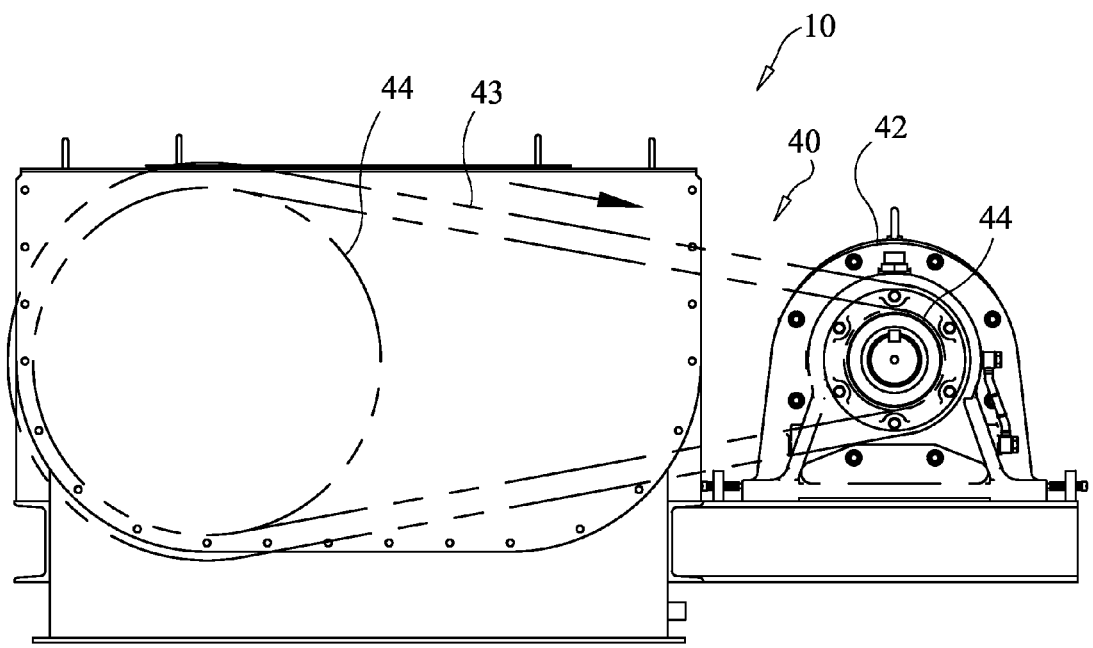
FIG. 2 is a right end view of the drive-end portion of the prior-art system of FIG. 1.
Figure 3:
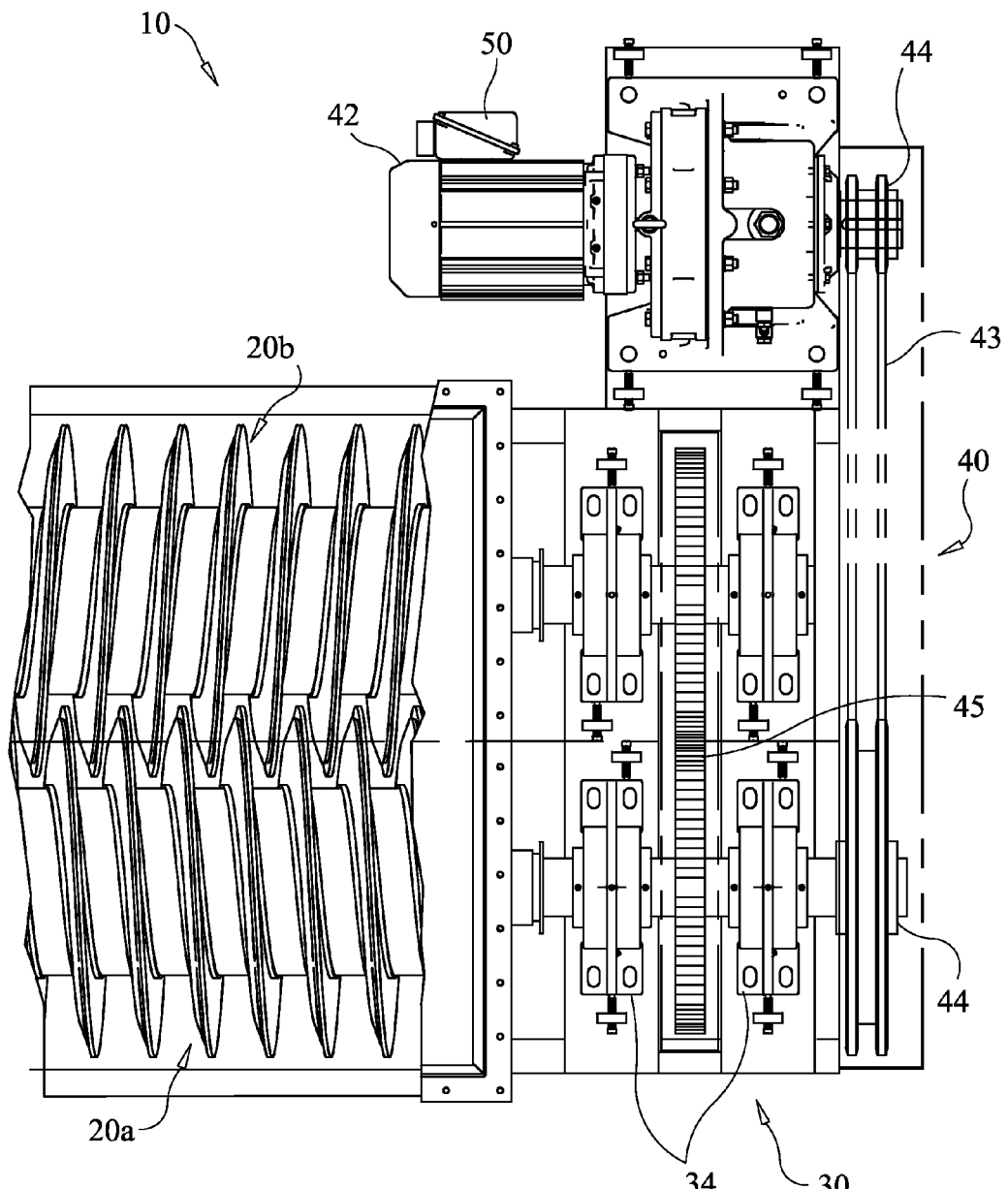
FIG. 3 is a plan view of the drive-end portion of the prior-art system of FIG. 1.
Figure 4:
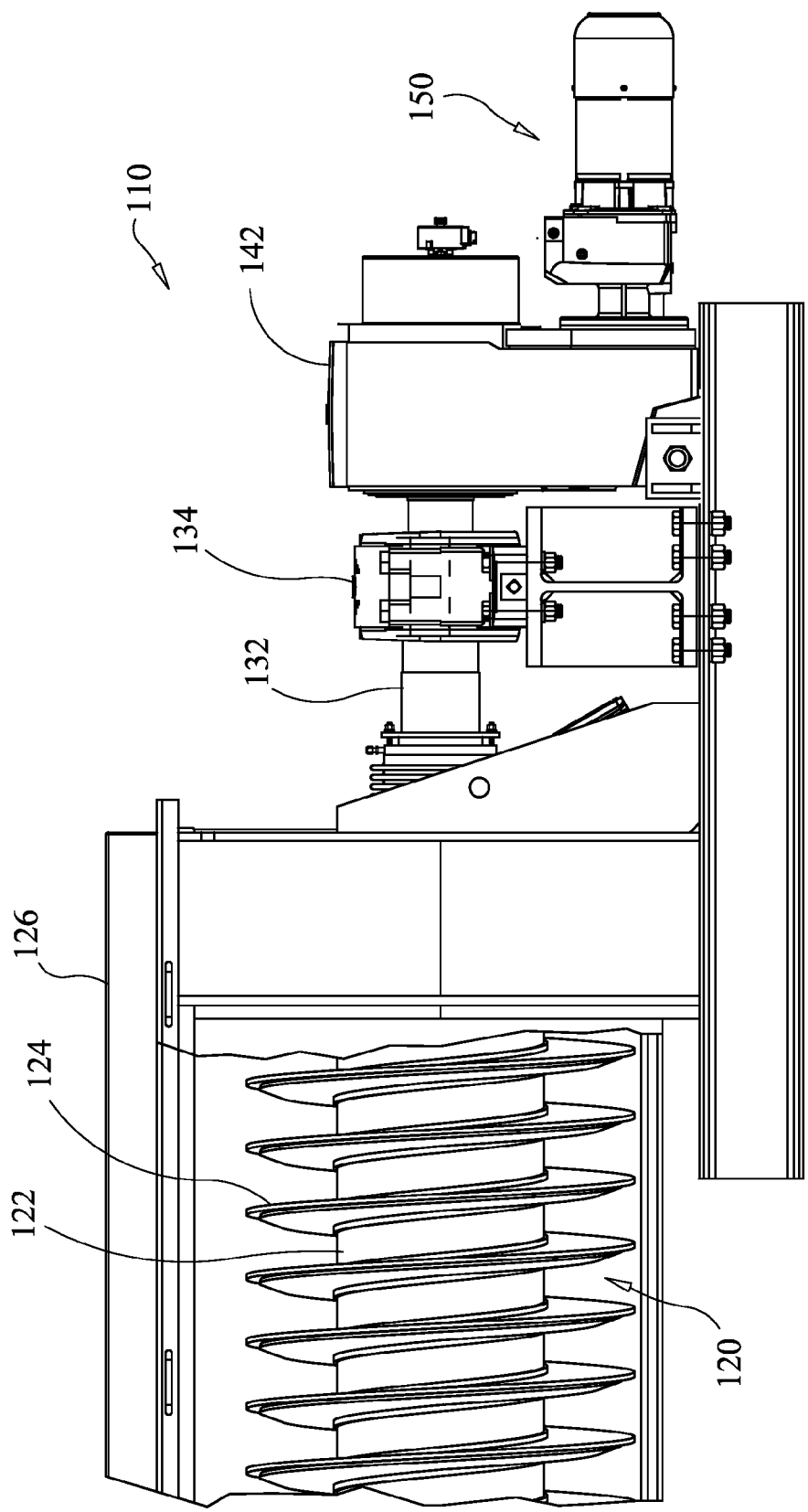
FIG. 4 is a side view of a drive-end portion of a multi-screw heat-exchanger conveyor system according to a first example embodiment of the present invention.
Figure 5:
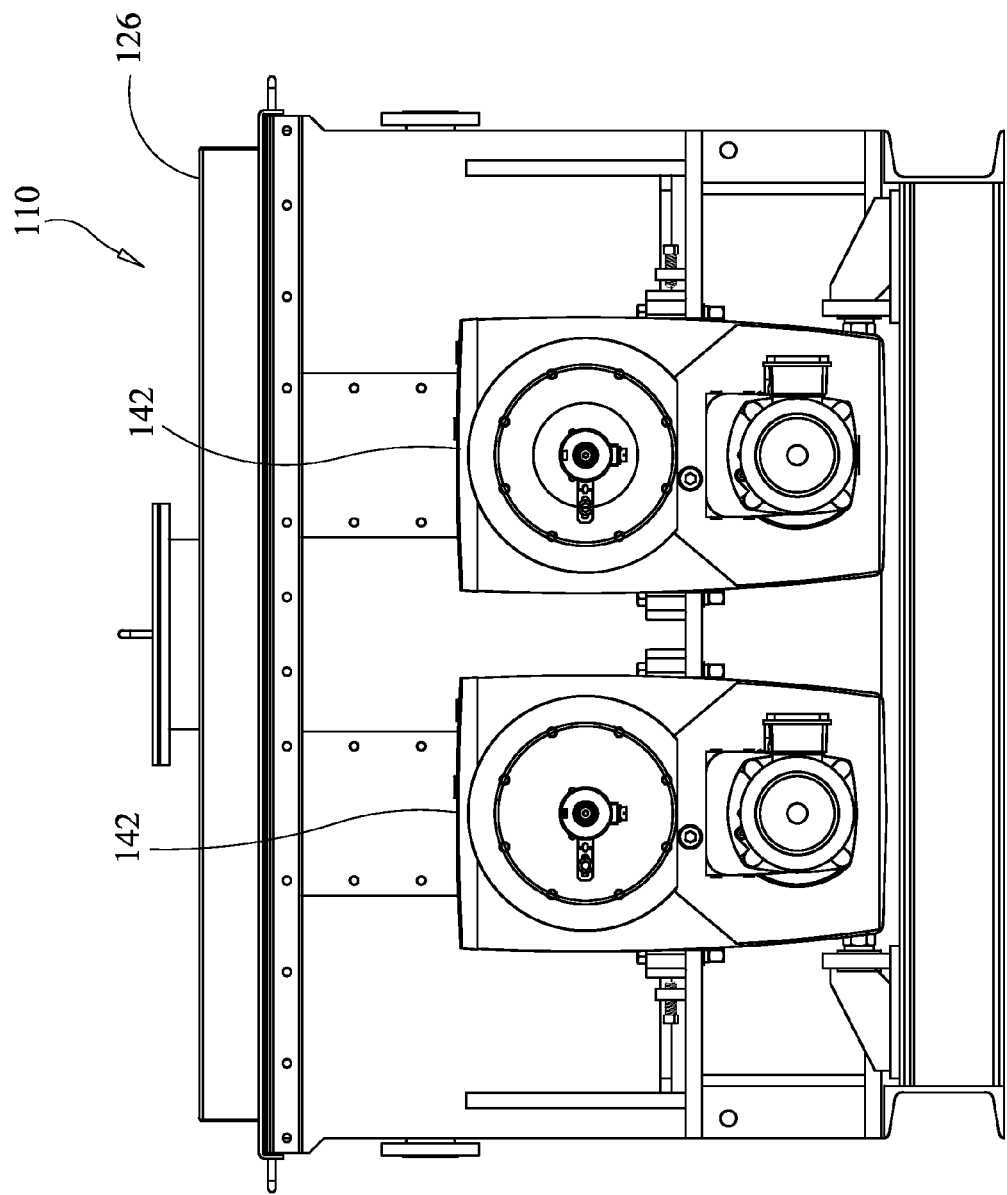
FIG. 5 is a right end view of the drive-end portion of the system of FIG. 4.
Figure 6:
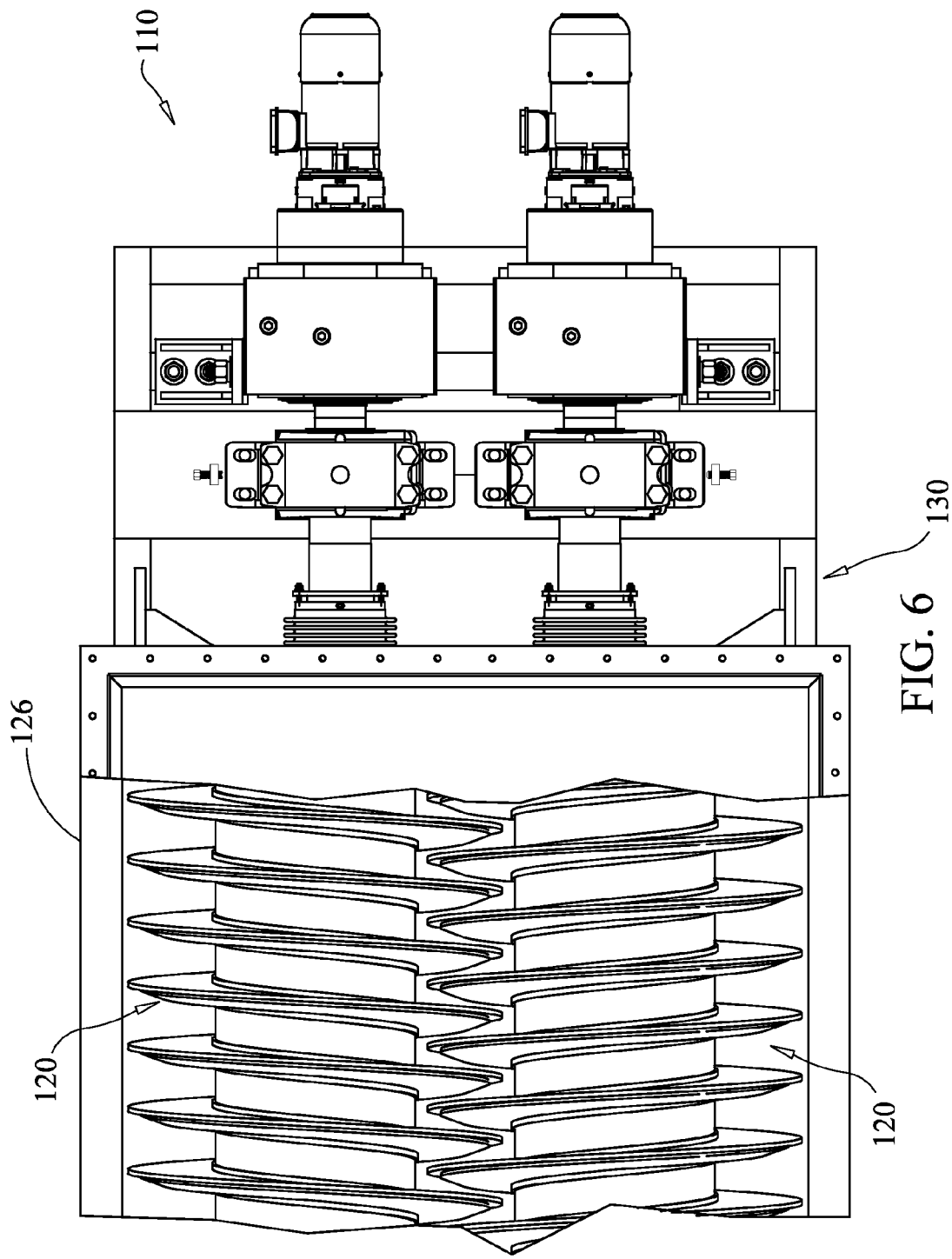
FIG. 6 is a plan view of the drive-end portion of the system of FIG. 4.

The present invention relates to screw-type heat-exchanger systems including multiple rotary screw conveyers arranged in parallel with overlapping flights. FIGS. 4-15 show a multi-screw heat-exchanger system 110 according a first example embodiment of the present invention. The system 110 is similar to the prior-art multi-screw heat-exchanger system 10 of FIGS. 1-3 in that it includes two screw conveyors 120 (also referred to herein as "screws"), a screw-mounting assembly 130 for each screw, a screw-drive assembly 140 for driving the screws, and a control system 150 for operating the screw-drive assembly. The screw conveyors 120 each include a rotary shaft 122 with a helical flight (e.g., vane) 124 extending radially outward from the shaft along at least a substantial portion of the shaft's length so that the flights overlap with each other, with the shafts and flights defining heat-exchange surfaces. The screw conveyors 120 are typically (but not necessarily) housed in a conventional housing 126 for containing the material to be processed. The screw-mounting assemblies 130 include, at each end (input/head and output/tail) of each screw 120, a rotary drive shaft 132 extending axially from the respective screw shaft 122 and at least one rotary bearing 134 mounted on that drive shaft.

In this system 110, however, the screw-drive assembly 140 includes dedicated actuators 142 for directly driving each of the screws 120 independently, and the control system 150 includes controls for operating each of the actuators 142 independently to drive the screws 120 at the same or differing speeds while controlling the clocking so that the flights 124 do not collide with each other. Because the screws 120 are independently driven with the clocking controlled by the control system 150, there is no need to include any bull gears for indirectly driving and clocking the screws. And because there are no bull gears, only one rotary bearing 134 need be included at the head end of each of the screws (in addition to the rotary bearing at the tail end of each of the screws). Eliminating the requirement for the bull gears with the extra bearings per screw thereby eliminates the need to undertake the difficult and costly precision alignment of these components during installation and after field service.

The rotary bearings 134 are typically positioned outside of the housing 126, as depicted. Thus, the head and tail bearings 134 typically support all of the weight of the screw 120; no additional bearings are needed at the seal where the screws extend through the housing 126. But if desired, the bearings could be positioned at the sealed area where the screws 120 extend through the housing 126, or even inside the housing if the application permits.

The actuators 142 can be provided by, for example, VFD-duty rotary gear-motors that are coupled to and rotationally drive the drive shafts 132. In a typical commercial embodiment, gear-motors such as Model No. SK11382/52AZSH VL VG-160M/4CUS by NORD Gear Corporation (Corona, Calif.) are used. In other embodiments, the actuators 142 are provided by other motors, gear-reducers, hydraulic motors or actuators, chains and sprockets, flexible couplings, linear actuators with converter mechanisms for converting the linear motion to rotational motion, a combination of these, or other actuators known to those skilled in the art.

The multi-screw heat-exchanger system 110 can be provided with any number of overlapping screws 120, each with their own dedicated actuator 142. In the depicted embodiment, for example, there are two screws 120 and thus two actuators 142. In other embodiments, there are three or more screws 120 and an equivalent number of actuators 142, with each screw overlapping at least one of the other screws. Each of the screws 120 are driven independently by their dedicated actuator 142 and controlled by the control system 150 to drive the screws at the same or differing speeds while controlling the clocking so that the flights 124 of overlapping screws do not collide with each other. It should be noted that, as used herein, the phrase "one-to-one dedicated relationship" means that each screw conveyor is operably driven by at least one individual respective actuator, and includes arrangements in which a screw conveyor is operably driven by more than one respective actuator (thus, there can be two actuators for driving a single screw conveyor, for example a two-screw system having four actuators, with two actuators per screw).

Figure 7:
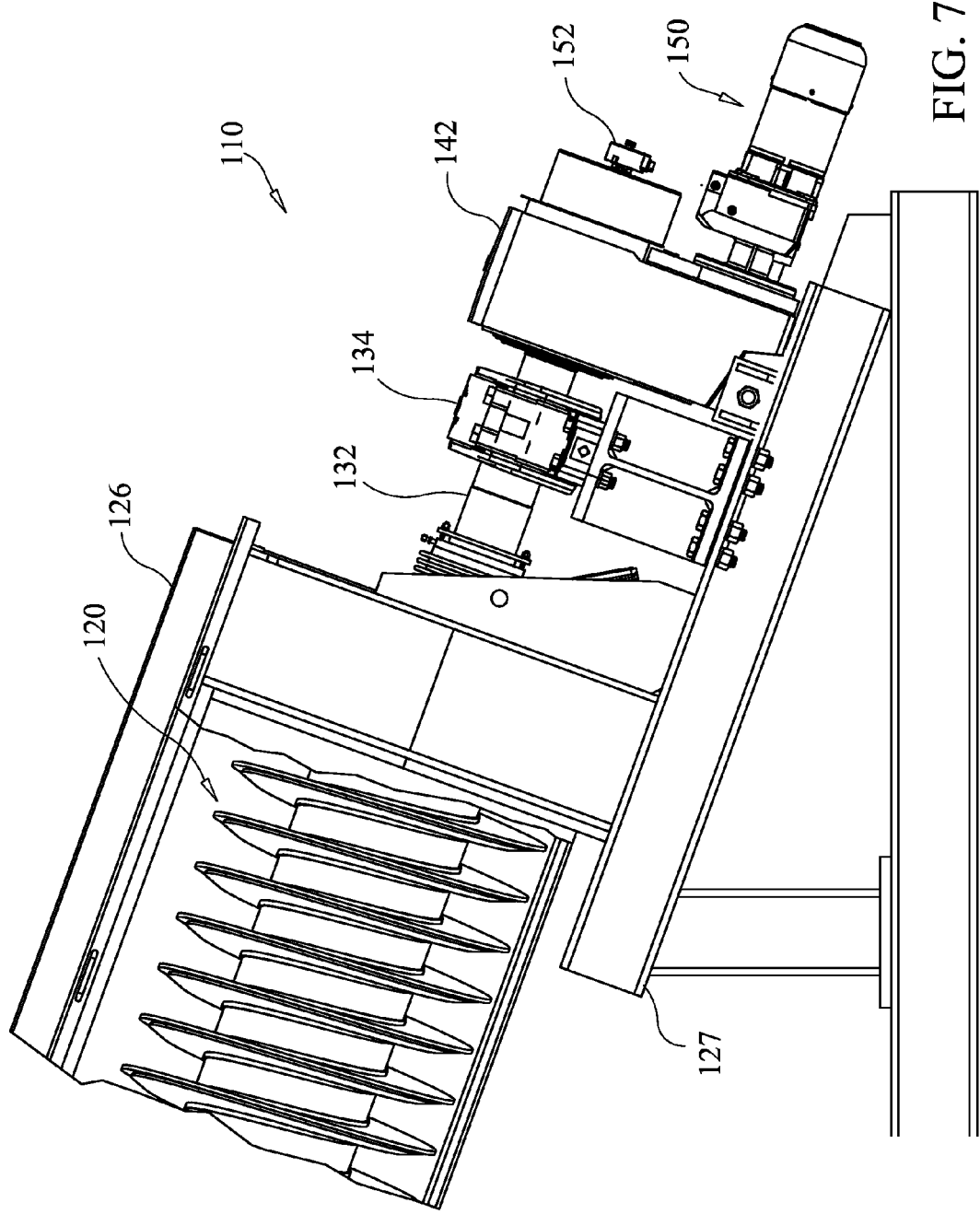
FIG. 7 shows the drive-end portion of the system of FIG. 4 installed on an incline for use and enlarged to better-show the control system.
Figure 8:
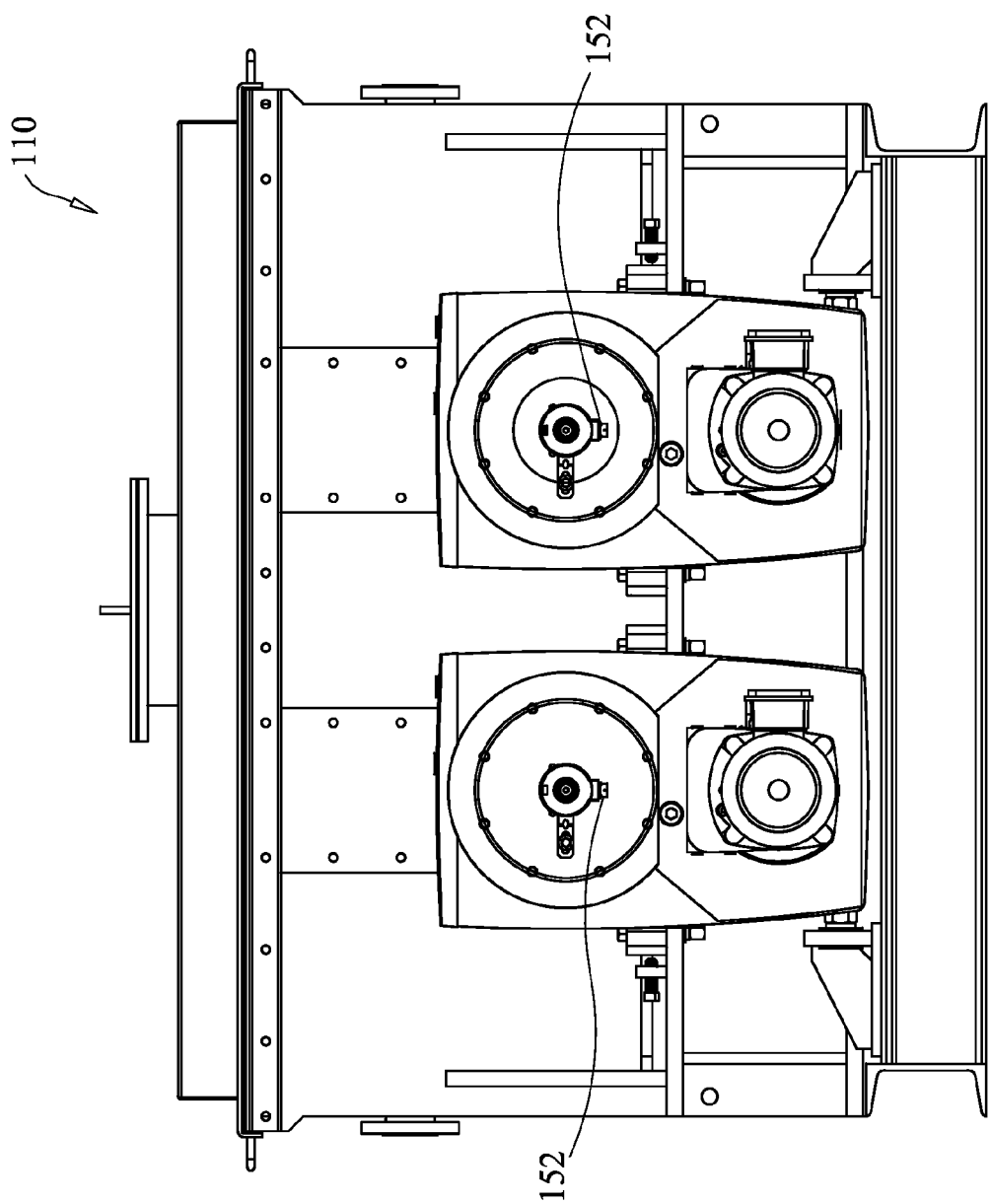
FIG. 8 shows the drive-end portion of the system of FIG. 5 showing a portion of the control system.
Figure 9:
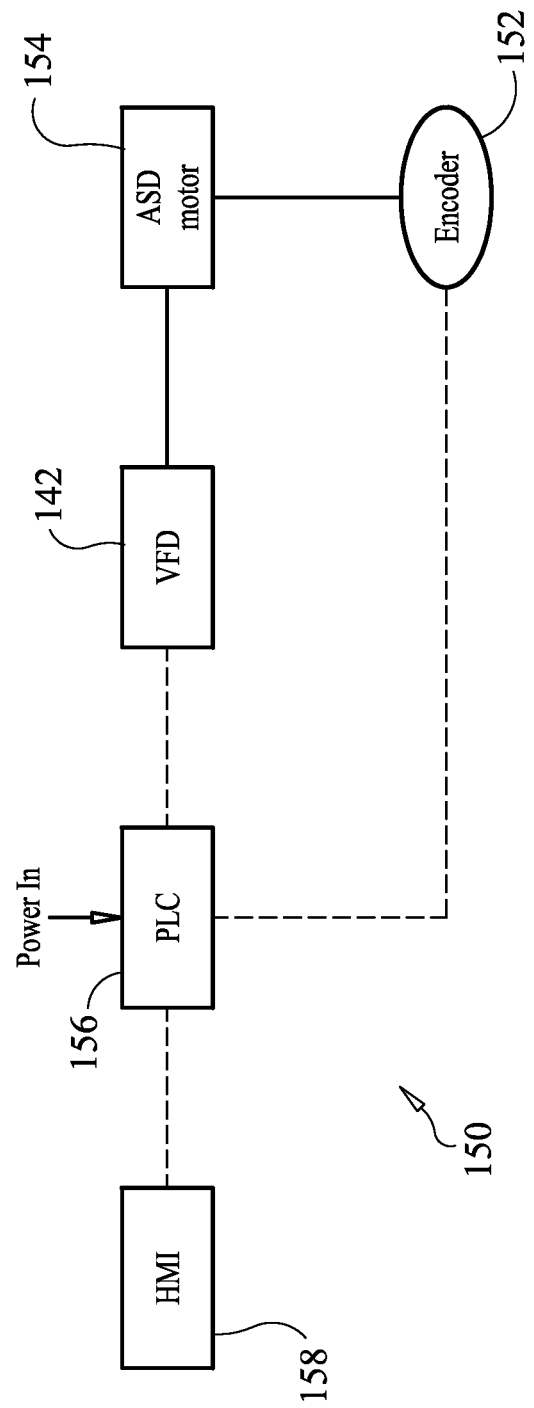
FIG. 9 is a block diagram of the control system of FIGS. 7-8.

Referring particularly to FIGS. 7-9, the control system 150 includes controls for operating each of the actuators 142 independently to drive the screws 120 at the same or differing speeds while controlling the clocking so that the flights 124 do not collide with each other. In the depicted embodiment, these controls include a screw-position sensor 152 for each screw 120, an adjustable speed drive (ASD) 154 for each actuator 142, a controller 156 with a control program, and a human-machine interface (HMI) 158. In other embodiments, the control system 150 includes additional or substitute components selected for performing the functions of the control system described herein, which selecting is within the knowledge of a person of ordinary skill in the art.

The screw-position sensors 152 detect the rotational position of their respective screws 120 (or the axial position of their respective flights 124) for clocking purposes and communicate an input to the controller 156. The sensors 152 can be provided by shaft-mounted encoders, for example, absolute encoders that indicate the rotational position (e.g., relative to a pre-defined "home" position) of their respective screws 120. In a typical commercial embodiment, encoders such as Model No. X HS35-F-100-R2-SS-12-gc-28V/V-CW-SM14/19 by BEI Sensors (Goleta, Calif.) are used. In other embodiments, the sensors 152 are provided by Hall-effect proximity sensors with an output counter to the controller 156.

The sensors 152 can be mounted on their respective actuators 142, drive shafts 132, bearings 134, or screws 120, or to another rotary drive-train component operably coupled to the screws so that the sensors measure the relative rotational positions of the screws 120. In embodiments in which the sensors 152 are mounted to their respective actuators 142, they are mounted to the output shaft (as depicted) or another rotary part of the actuator, mounted internally or to the exterior of the actuator, and provided as an integral component or a separate component assembled onto the actuator after it is manufactured. In embodiments in which the sensors 152 are mounted to their respective bearings 134, they are mounted, for example, to an inner rotary collar of the bearing 134 that is mounted to the drive shaft 132. And in embodiments in which the sensors 152 are mounted to their respective screws 120, they are mounted, for example, on the screw's shaft 122 or its flighting 124 for rotational/or or axial position detecting.

In some embodiments, the sensors 152 are not mounted to the respective screws 120, drive shafts 132, or output shafts of the actuators 142, but instead are mounted to other rotary components of the system 110 such that they do not measure each 360-degree revolution of these components. In such embodiments, the mechanical ratio of the rotary component on which the sensor 152 is mounted to the screw 120 is entered into the control program of the controller 156 so the control program can convert the input from the sensor to the screw's clock position. For example if the sensor 152 is provided by a rotational sensor that counts revolutions of an internal component of the actuator 142 and the mechanical ratio is 720:1 between the actuator component and the screw 120, then each 360-degree revolution of the actuator component represents 0.5 degree of rotation of the screw.

The ASDs 154 are operably coupled to their respective actuators 142, and receive inputs from the controller 156, to control the actual speed and relative speed (and thus the clocking) of their respective screws 120. In a typical commercial embodiment, the ASDs 154 are provided by variable frequency drives (VFDs) such as Model No. Power Flex 70 by Allen Bradley, the controller 156 is provided by a programmed logic controller (PLC) such as Model No. CPU 1756-L61 by Allen Bradley, and an HMI 158 such as Model No. 2711P-T10C4A2 by Allen Bradley is used. In other embodiments, other ASDs 154, controllers 156, and/or HMIs 158 are used. For example, the ASDs 154 can be provided by another type of VFD, DC variable-speed drives, DC controllers and motors, servo-motors, stepper motors, other precision motors, or mechanical variable-speed drives such as cone, belt, and automatic transmissions. The controllers 156 can be provided by another type of PLC, a distributed control system (DCS), or another type of logic controller. And the HMI 158 can be provided by most any conventional personal computer. The HMI 158 can be included as a component of the system 110 as provided by the manufacturer or it can be provided separately by the distributor or user. In addition, the control program can split between the controller, the ASD, the HMI, and/or other conventional components capable of storing logic programming.

The controller 156 receives inputs from the sensors 152 and sends outputs to the ASDs 154 to control the clocking of the screws 120. The clocking (the relative axial position of the helical flights 124 of adjacent overlapping screws 120) is controlled by advancing or retarding the rotation of one of the screws relative to the other. To do this, the control program of the controller 156 instructs the ASDs 154 to accelerate or decelerate one or both of the screws 120 for a predetermined period of time (i.e., to increase or decrease the rotational speeds of one or both of the screws).

Figure 10:
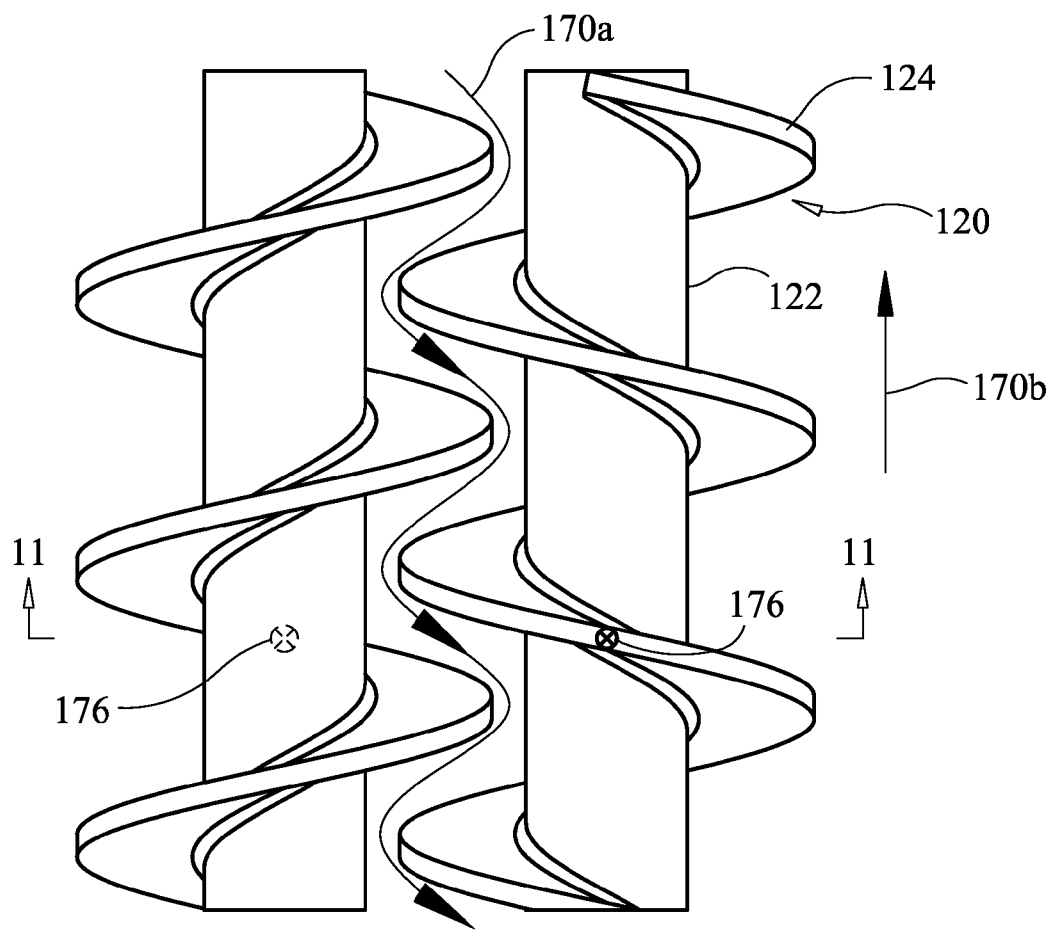
FIG. 10 is a plan view of portions of two rotary screws of the system of FIG. 4, showing the flights in a normal or midpoint clocking position.

Referring particularly to FIGS. 10-15, details of the variable clocking feature will now be described. The sensors 152 detect, and the controller 156 controls, the rotational position of the respective screws 120 (e.g., relative to a pre-defined "normal" or "home" position). As shown in FIG. 10, for example, in the depicted embodiment the normal position is defined by the flights 124 of one screw 120 being at about the axial/longitudinal midpoint between the flights of the adjacent overlapping screw. This is sometimes referred to as the "midpoint" clocking position, and is the standard fixed clocking position for most conventional multi-screw heat-exchanger systems. As shown by the clock markings 176 in the embodiment of FIGS. 10-11, in the midpoint clocking position a designated clock marking on the flighting 124 of the left screw 120 is at the 6 o'clock (180-degree) position when a designated clock marking on the flighting of the right screw 120 is at the 12 o'clock (0/360-degree) position, with the clock markings 180 degrees apart. It should be noted that the clock markings 176 and their positions are representative and included for illustration purposes only.

In the depicted example application, a free-flowing material is being processed, such as a heterogeneous material (e.g., solid chunks 170b in a fluid 170a, collectively "the material 170") or a homogeneous pelletized or granular material. Because the screw conveyors 120 are in the midpoint clocking position and inclined from inlet/head to outlet end/tail, and because the material 170 being processed is free-flowing, the material (or at least a fluid 170a or otherwise free-flowing portion of it) back-flows due to gravity through the generally sinusoidal passageway defined by the flights 124 (as indicated by the directional arrow representing the fluid portion of the material). The intended upward axial conveyance direction for the material 170, and the actual conveyed direction of any chunks 170b of the material, are in the forward direction from the input/head to the output/tail end (indicated by the directional arrow representing the chunky portion of the material).

However, even though this midpoint clocking position permits the backflow of such materials 170, the design of the system 110 enables the screw conveyors 120 to be co-rotated (as indicated by directional arrow 174) in the same direction. Thus, rotation of the screws 120 in the same angular direction can significantly improve the mixing of the material 170.

Figure 12:
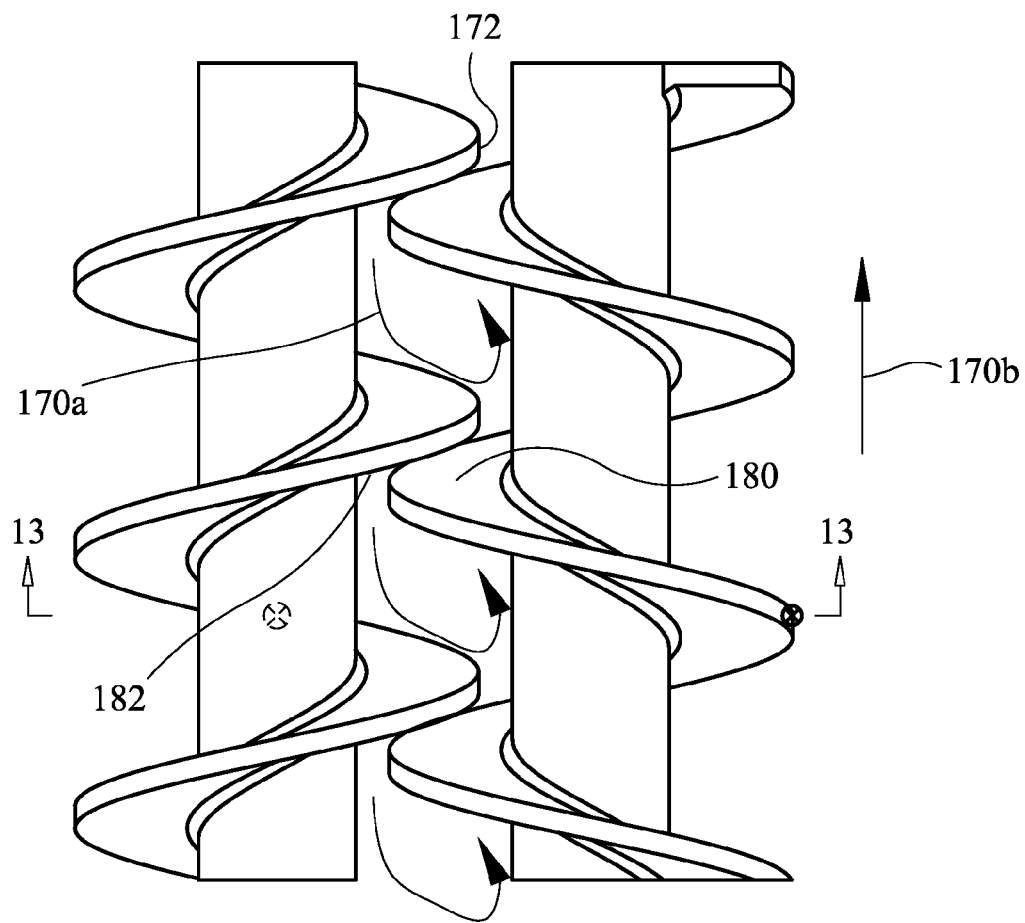
FIG. 12 shows the two screw portions of FIG. 10 with their relative speeds changed so that the flights are now in an advanced clocking position.
Figure 13:
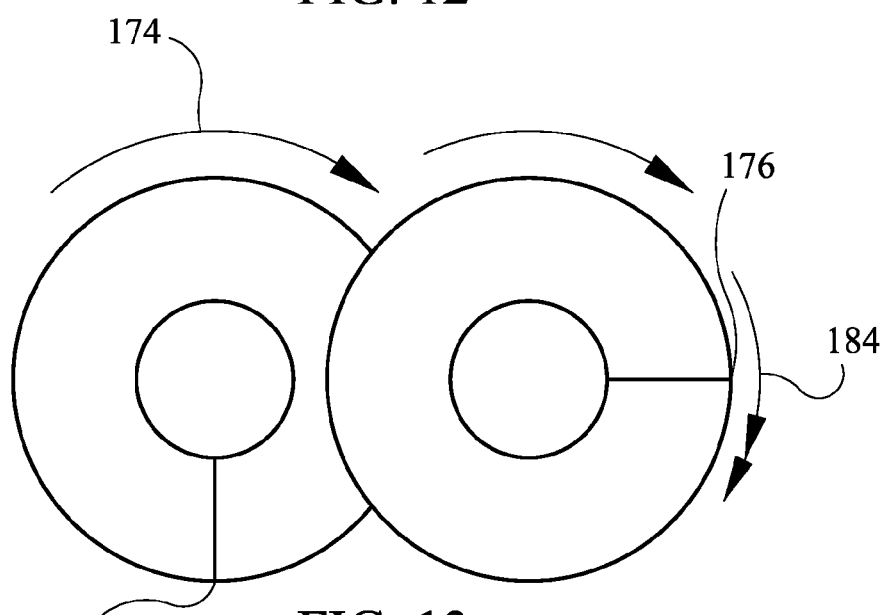
FIG. 13 is a cross-sectional view taken at line 13-13 of FIG. 12.

Referring to FIGS. 12-13, the speed of the screws 120 relative to each other has been changed to axially move the screws to an "advanced" clocking position. As shown by the clock markings 176 in the depicted embodiment, in the advanced position the designated clock marking on the flighting 124 of the left screw 120 is at the 6 o'clock (180-degree) position, but now the designated clock marking on the flighting of the right screw is at the 3 o'clock (90-degree) position (an advancement of 90 degrees so that the screws are now 270 degrees apart). This is done by increasing the angular speed (by acceleration 184) of the right screw relative to the left screw for a pre-determined period of time and/or number of revolutions until the front surface 180 of the flighting 124 of the right screw 120 is in close proximity to the back surface 182 of the flighting of the left screw. The relative speed adjustment made to each of the screws, if any (only one screw can be accelerated), if any, can be according to any of the clocking control methods described herein or others not disclosed herein.

Figure 14:
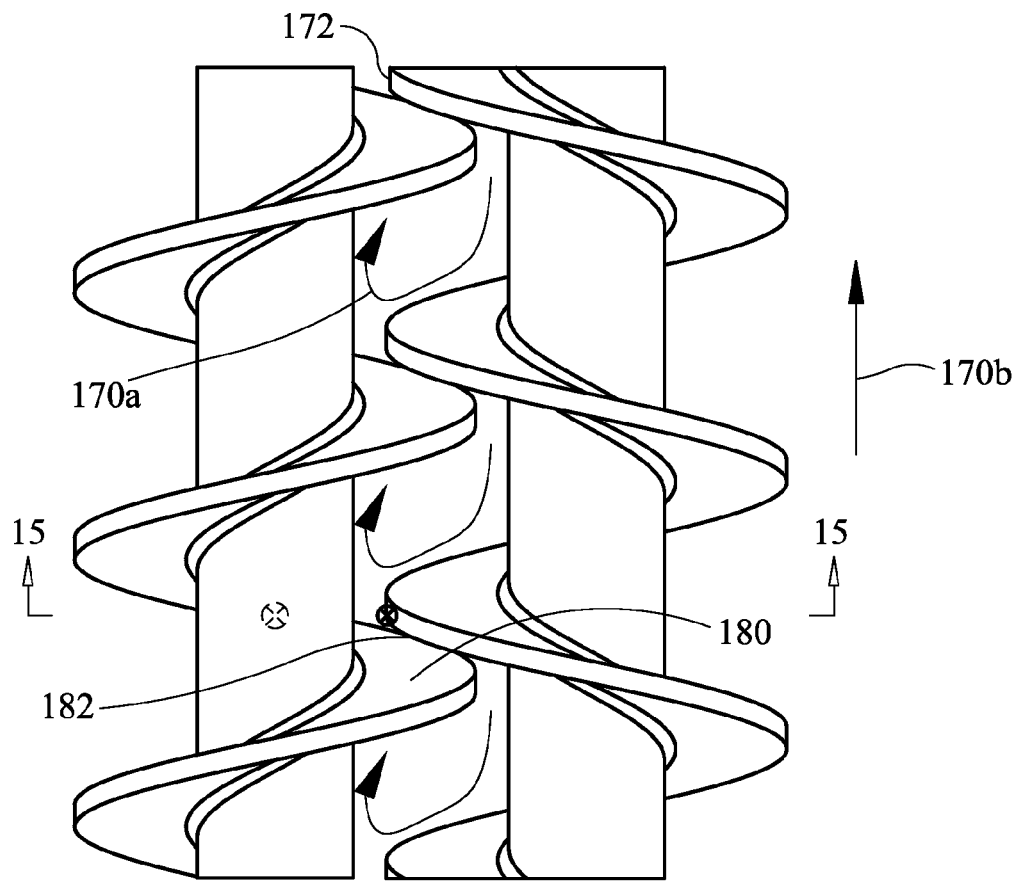
FIG. 14 shows the two screw portions of FIG. 10 with their relative speeds changed so that the flights are now in a retarded clocking position.
Figure 15:
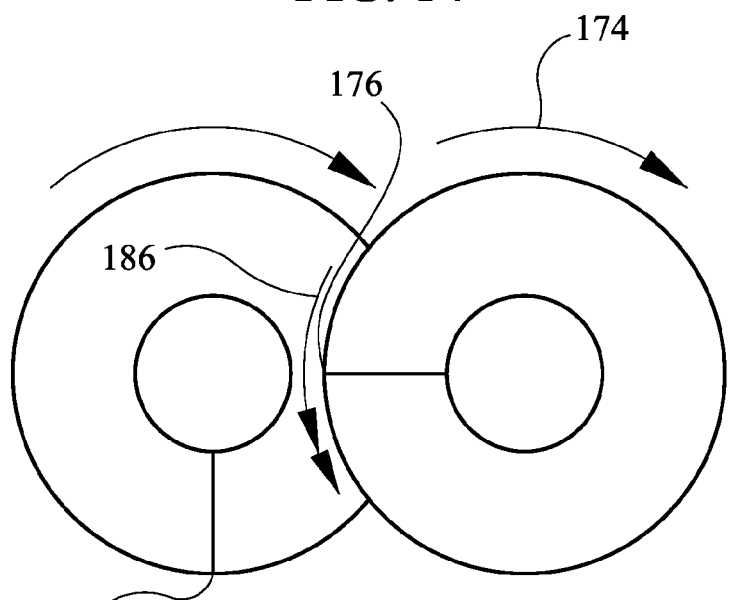
FIG. 15 is a cross-sectional view taken at line 15-15 of FIG. 14.

Referring to FIGS. 14-15, the speed of the screws 120 relative to each other has been changed to axially move the screws to a "retarded" clocking position. As shown by the clock markings 176 in the depicted embodiment, in the retarded position the designated clock marking on the flighting 124 of the left screw 120 is at the 6 o'clock (180-degree) position, but now the designated clock marking on the flighting of the right screw is at the 9 o'clock (270-degree) position (a retardment of 90 degrees so that the screws are now 90 degrees apart). This is done by decreasing the angular speed (by deceleration 186) of the right screw relative to the left screw for a pre-determined period of time and/or number of revolutions until the back surface 182 of the flighting 124 of the right screw 120 is in close proximity to the front surface 180 of the flighting of the left screw.

As mentioned above, the clock markings 176 and their specific positions are representative and included for illustration purposes only. Thus for example any positions of the clock markings 176 that are 180 degrees apart can be defined as the normal position, any positions of the clock markings that are 270 degrees apart can be defined as the advanced position, and any positions of the clock markings that are 90 degrees apart can be defined as the retarded position.

The relative speed adjustment to the screws 120 can be made according to any of the clocking control methods described herein or others not disclosed herein. It will be understood, then, that while in the depicted embodiment the left screw 120 is maintained at a constant speed and the right screw is accelerated and decelerated, other clocking control methods can be used that involve, for example, varying the speed of both screws or only the left one.

To advance the screws 120 to the advanced clocking position shown in FIGS. 12-13, the screw speed(s) can be varied so that the right screw rotates the extra 90 degrees in most any number of revolutions as may be advantageous for the particular application and material being processed. Thus, the extra 90 degrees can be covered in a single revolution by rotating the right screw 1.25 times faster than the left screw, in ten revolutions by rotating the right screw 1.025 times faster than the left screw, etc.

Similarly, to retard the screws 120 to the retarded clocking position shown in FIGS. 14-15, the screw speed(s) can be varied so that the right screw rotates the 90 degrees fewer in most any number of revolutions as may be advantageous for the particular application and material being processed. Thus, the 90 degrees fewer can be covered in a single revolution by rotating the right screw 0.75 times slower than the left screw, in 10 revolutions by rotating the right screw 0.075 times slower than the left screw, etc.

With the screws 120 in the depicted advanced and retarded positions, the front surface 180 of one of the flights 124 and the back surface 182 of the proximally opposing flight will abrade and scrap off any built-up material 170 on these flight surfaces. To ensure maximal cleaning of the flights surfaces 180/182, the control program can be set up to cause the screws 120 to rotate through a few revolutions in these positions and/or to advance/retard to such close proximity that any further advancement/retardment will cause the flights to interfere and collide with each other. And as the screws 120 are adjusted between the advanced and retarded positions in this oscillating manner, the outer edges 172 of the flights 124 clean away built-up material 170 on the screw shafts 122.

The axial separation distance between the flights 124 in the advanced and retarded positions can be selected based in part on the material to be processed, the rotational speed of the screws 120, and/or other considerations that might factor in certain applications. In typical commercial embodiments for processing conventional materials, the screws 120 have an axial length on the order of about 24 feet to about 35 feet, the screw shafts 122 have a radius on the order of about 9 inches to about 15 inches, the radial gap between the flight outer edges 172 and the screw shafts 122 is on the order of about ¾ inches, and the flights 124 have a radius on the order of about 8 inches to about 9 inches, with the axial inter-flight separation being on the order of about 1 inch.

In addition, it should be noted that with the screws 120 in the depicted advanced and retarded positions, substantially all the material 170 (including the fluid portion 170a and the chunky portion 170b) is directed upward and forward along the upwardly inclined screws 120. The material 170 is substantially restricted from back-flowing down the screws 120 in the advanced and retarded positions because the flights 124 are in such close proximity that very little or none of the material passes under the influence of gravity through the inter-flight axial separation gap. Instead, the proximally positioned flights 124 form a dynamic traveling dam that pushes the material 170 forward to achieve a positive uphill transport for upwardly inclined screws 120. For very free-flowing materials 170, any of the fluid portion 170a that might have back-flowed through the small inter-flight axial gap (especially when it is enlarged in the screw's midpoint position), much of this is redirected back up and forward with the chunky portion 170b. And any residual material 170 (e.g., a fibrous portion of a heterogeneous material or a material that tends to form into a log and rotate with the screws 120), which is not conveyed out of the system and thereby reduces the conveying capacity and increases the required torque, is pushed forward by the flights 124 and out of the system 110. This results in a more predictable residence time of the material 170 adjacent the heat-exchange surfaces of the screws 120 for improved processing by and increased thermal efficiency of the system 110.

It should be further noted that in other embodiments the screws have flights with different helical patterns from those shown in FIGS. 10-15. In some such embodiments, in the advanced and retarded positions the screws are other than 270 degrees and 90 degrees apart, respectively. In addition, the 6 o'clock/3 o'clock (180-degree/90-degree) position of the screws 120 depicted in FIGS. 12-13, and the 6 o'clock/9 o'clock (180-degree/270-degree) position of the screws depicted in FIGS. 14-15, are representative for illustration purposes only. Thus, the normal, advanced, and retarded positions can be defined by other clock positions or degrees of a revolution as may be desired and beneficial in a given application.

Figure 16:
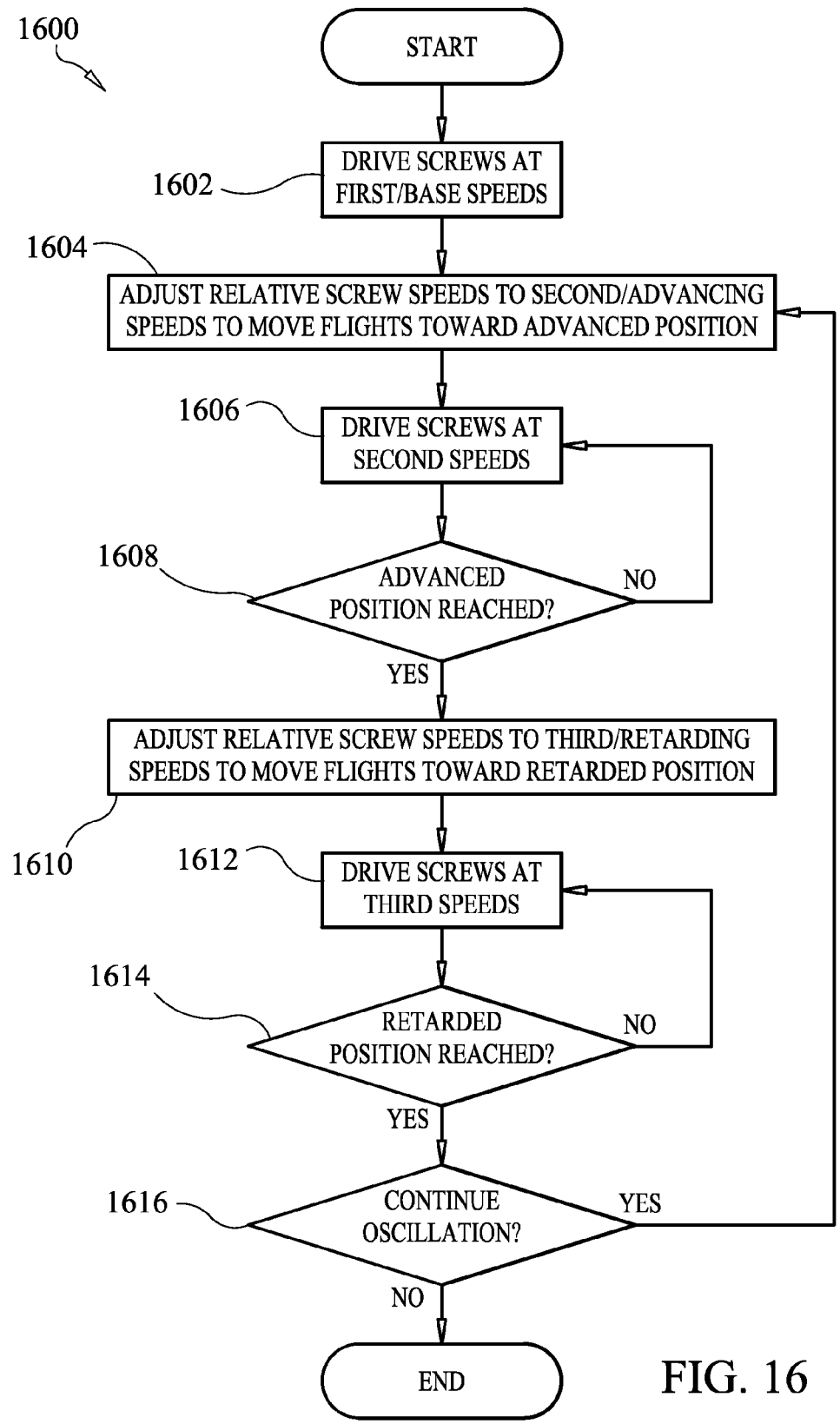
FIG. 16 is flow diagram of an example method of controlling the relative rotational speeds of the two screw portions of FIGS. 12-15 through an oscillating motion between advanced and retarded positions.

As indicated above, the sensors 152 detect, and the controller 156 controls, the rotational position of the respective screws 120. An example of the process-flow logic 1600 of the control program will now be described with respect to FIG. 16. Computer-executable instructions for carrying out this process flow can encoded onto a non-transitory computer-readable medium. The computer-readable medium can be provided by a fixed-medium data storage device such as a magnetic disk drive, a removable-medium data storage device such as a CD-ROM or DVD drive, or another conventional memory device.

Figure 11:
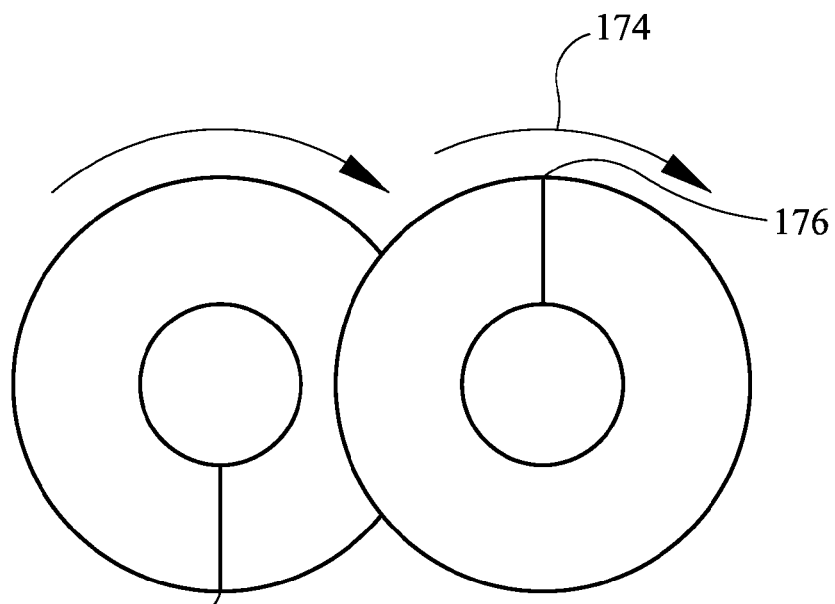
FIG. 11 is a cross-sectional view taken at line 11-11 of FIG. 10.

In this example, the rotational position of the respective screws 120 is detected and controlled, relative to a pre-defined "normal" or "home" position such as such as the 6 o'clock and 12 o'clock positions of FIGS. 10-11, between advanced and retarded positions. The clocking position set points (normal, advanced, and retarded) are set in the control program as limit values. The normal position is the reference from which the limits for the advanced and retarded positions are handled as deviations. Typically, but not necessarily, the midpoint position is defined as the normal/home position. The screw positions can be shown in real time on a display screen of the HMI 158 as a graph including the actual position and the theoretical location based on the speed(s) of the screws 120.

The screw speeds are entered into the HMI 158 as a controller 156 set point for conveying capacity, with the speeds typically being the same for each of the screws 120 (i.e., a common speed is set). The user can also enter additional process parameters as additional controller set points. The additional process parameters can include, for example, maximum screw speed, material temperatures at certain points along the screw, material output temperature, vapor vent temperature, maximum angle of advancement and retardation of the screws, length of time in reverse mode (with the screws rotational directions reversed) for enhanced mixing, speed during reverse mode, and length of interval between reverse mode cycles. Optionally, the conveying speed can be automatically determined and/or updated based on changes in upstream or downstream operations. Thus, the user can input a common conveying speed (e.g., a first/base speed) desired for both of the screws 120 and/or it can be set and/or adjusted based on less direct variables in the control program algorithms for the screw speed (e.g., as a proportional deviation from the common base speed). Typically, the controller 156 is also programmed to control other system components and process parameters such as the temperature of the heat transfer fluid as the capacity changes. The controller set points can be determined by the user based on the particular application, as discussed herein, and entered into the HMI 158.

Based on the conveying rotational screw speed and the additional controller set points for the material-treatment process, the controller 156 then sends first/base speed indicators (e.g., signals) to the ASDs 154 to set the (e.g., common) first/base rotational speed for both screws 120 and at step 1602 the two screws are driven at the first/base speeds in the normal position (e.g., for just a few revolutions until the screws get up to speed). The additive and/or subtractive speed (acceleration or deceleration) at which one or both screws 120 are rotated, and the duration of the speed increase or decrease, needed to advance and/or retard the screws to the advanced and retarded positions can be pre-set in the control program and selected by the user (from multiple available options selectable via the HMI 158) for the particular application. Alternatively, the controller 156 can calculate the rates of change of speed based on user-defined set points. The controller 156 then adds the additive speed to, or subtracts the subtractive speed from, the common speed to determine the new speeds needed to make the adjustment in the clocking of the screws 120 between the advanced and retarded positions. The clocking adjustment is made by the controller 156 sending to the ASDs 154 new-speed indicators to increase or decrease the speed(s) of the respective screws 120 to the new speeds for the needed durations. That is, the relative screw speeds are adjusted to axially move the screw flights toward advanced or retarded positions, whether by changing the speeds of both screws, only a designated one of the screws, alternating ones of the screws, etc.). The ASDs then cause the actuators 142 to accelerate and/or decelerate the screws 120 until they reach the advanced and retarded positions. This process is then repeated for a set period of time, number of revolutions, etc., until the material-treatment process is completed.

For example, at step 1604 the relative speeds of the screws 120 are adjusted to second/advancing speeds to axially move the screw flights toward a pre-set advanced position. And at step 1606 the screws 120 are then driven at the second/advancing speeds. The rotational positions of the screws 120 are regularly monitored, and the screws continue to be driven at the second/advancing speeds until the advanced position is reached at step 1608. Upon reaching the advanced position, the relative speeds of the screws 120 can be adjusted to a common speed to maintain the screws there for a number of revolutions. Immediately upon reaching the advanced position or after a period of operation there, the relative speeds of the screws 120 are adjusted to third/retarding speeds to axially move the screw flights toward a pre-set retarded position at step 1610. And at step 1612 the screws 120 are then driven at the third/retarding speeds.

The rotational positions of the screws 120 are regularly monitored, and the screws continue to be driven at the third/retarding speeds until the advanced position is reached at step 1614. Upon reaching the advanced position, at step 1616 the process can be repeated in an oscillating manner by returning to step 1604. After completion of the oscillating process, at step 1616 the process is concluded. Before such conclusion, the relative speeds of the screws 120 can be adjusted to return the screws to the normal position, if desired.

If one screw 120 experiences a greater slip from a higher load than the adjacent overlapping screw does (e.g., by the anomalies in the material 170), then the clocking can get off slightly, and eventually the screws would drift from their intended clocking positions until their flights 124 collide with each other. To prevent this, the control program includes a clocking-correction method in which the controller 156 uses screw-position indicators received from the sensors 152. Once the screws 120 start rotating, the sensors 152 begin continuously sensing the rotational positions of the screws 120 relative to their home positions, and sending the screw-position indicators of the screws' rotational positions to the controller 156. In embodiments in which the sensors 152 are provided by absolute encoders, they can sense the speed and absolute rotational position of the screws 120 with great precision (e.g., signals with 0.1-degree precision), and they can be mounted to the screw shafts 132 at the home positions so that the rotational position of the sensor defines the rotational position of the respective screw 120.

At a pre-determined interval (e.g., up 100 times per second, or at once each screw 120 revolution based on the predefined "home" position), the controller 156 determines the relative rotational position of the screws 120. The controller 156 does this for example by determining intended absolute positions of the screws (e.g., calculated based on the time and speed of rotation, or predefined for that number of revolutions in the sequence) and then comparing that to the actual absolute positions of the screws 120 (based on the screw-position indicators received from the sensors 152) to get the deviation from the intended position.

If the controller 156 determines that the screws 120 are out of their intended relative rotational position by more than a predefined clocking tolerance, then the speed of one or both of the screws 120 is adjusted slightly. To do this, the controller 156 then sends a speed-adjustment indicator to the appropriate ASD 154 to cause that actuator 142 to make the needed speed adjustment to the appropriate screw 120. For example, if the controller 156 determines that the actual relative rotational position of the screws 120 is not equal to the intended relative rotational position and that one of the screws is lagging, it can send a predefined speed-adjustment indicator to the ASD 154 for the lagging screw. For example, if the speed-adjustment indicator is predefined as 0.2 Hz, the screw 120 and shaft 132 are rotating at 3.0 rpm, and the actuator 142 is a motor operating at 30 Hz, then the screw would be rotating at 3.02 rpm after the 0.2 Hz speed increase. So if a screw 120 is out of position by lagging by 2.0 degrees, then after 16.5 seconds the screw would be back in the corrected position [((2 degrees/360 degrees)/(3.02 rpm−3 rpm))×60 sec/min=16.5 sec]. If, at the completion of the next revolution of the screws 120 (or at some other pre-determined interval), the controller 156 determines that the actual relative rotational position of the screws is still not equal to the intended relative rotational position, it can send another speed-adjustment indicator (e.g., 0.2 Hz) to the ASD 154 for the lagging screw. This clocking correction sequence continues until the screws 120 are back within clocking tolerance.

For safety purposes, the clocking-correction method can also include an auto-shutoff feature. For example, if the controller 156 determines that actual relative rotational position of the screws 120 ever gets beyond a predefined safety tolerance of the intended relative rotational position, it can send an indicator to the ASDs 154 to stop rotating the screws. Other safety features and components can be included in the system 110 as would be apparent to one of ordinary skill in the art.

In addition, the control system 150 can include components for automatic, manual override, or full manual operation. The full automatic mode can be as just described. In the manual override mode, the controller 156 controls the clocking of the screws 120, but the operator can adjust the clocking of the screws 120 based on visual inspection of the actual relative rotational positions of the screws by controlling the ASDs 154 via the HMI 158. And in the full manual mode, the controller 156 does not control the clocking of the screws 120, and instead the operator does based on visual inspection of the actual relative rotational positions of the screws by controlling the ASDs 154 via the HMI 158.

The control program of the controller 156 can be set up to control and vary the clocking of the screws 120 using any of several clocking control methods. In a first clocking control method, the speed of both screws 120 is varied. With the screws 120 in the normal midpoint position, a first one of the adjacent overlapping screws is advanced (its speed is increased while the speed of the second screw is held constant) to clock the screws to near interference of the flights 124 (the front surface of the flighting of the first screw axially approaches but does not contact the back surface of the flighting of the second screw). This will convey out any fouling material that has been retained and built up on the flighting surfaces 124 that have been moved into closer proximity. Then the second screw 120 is advanced (its speed is increased while the speed of the first screw is held constant) to clock the screws back through the normal position and then to again near interference of the flights 124 (the front surface of the flighting of the second screw axially approaches but does not contact the back surface of the flighting of the first screw). This will convey out any fouling material that has been retained and built up on the flighting surfaces 124 that have now been moved into closer proximity. The same process is then repeated in an oscillatory manner as many times as is needed to complete the material-treatment process and produce the desired results of drying, mixing, etc. The screws 120 can be advanced in this alternating manner at a constant speed, or they can be held in the advanced position for an interval (e.g., a pre-set time or number of revolutions) or advanced at variable speeds set to ensure that any retained material is removed and conveyed out. The same clocking function can be achieved by using this same process except alternately retarding (instead of advancing) each screw 120 in sequence. Alternatively, the screws 120 can be alternately advanced one after the other, then retarded one after the other, in a repeating sequence so that the screw speed does not progressively increase or decrease after multiple of these cycles.

In a second clocking control method, a first one of the adjacent overlapping screws 120 is designated as a constant-speed master screw (with its speed set for the material-treatment process conditions) and the second screw is designated as a variable-speed slave screw to be clocked relative to the constant speed screw. This is done by, with the screws 120 in the normal midpoint position, retarding the second screw to the retarded (near or nearer interference of the flights 124) position, then advancing it to the advanced (near or nearer interference of the flights 124) position to achieve the conveyance out of any material that had accumulated or fouled the heat-exchange surfaces of the flights. The screws 120 can be retarded and advanced in this alternating manner by operating the second screw at a constant or varying speed, or they can be held in the retarded and advanced position for an interval (e.g., a pre-set time or number of revolutions) set to ensure that any retained material is removed and conveyed out.

A third clocking control method advantageously maximizes the mixing of the material by moving hot dried material in close proximity to the hot heat-exchange surfaces of the screws 120 into the mass of wet cooler material and moving some of the wet cooler material into close proximity to the hot heat-exchange surfaces. This improved mixing effect obviates the need to recycle materials that tend to clod up in conventional equipment. In this method, the speed of both of the adjacent overlapping screws 120 is changed at the same time by the same amount but in first opposite directions to advance the clocking, then the speed changes are reversed in second opposite directions to retard the clocking, and this process is repeated as desired. For example, with the screws 120 in the normal midpoint position, a first one of the adjacent overlapping screws is accelerated by 50 percent and the second screw is decelerated by the same 50 percent for a first pre-set time interval T1. The time interval T1 is set for the time required to move the flights 124 into the advanced clocking position, before the flights reach interference. As an example, the time interval T1 can be set as less than the time required for one-quarter revolution of the screws 120 at the original speed (T1=<time of ¼ of a revolution). Next, the speed changes are reversed for a second time interval T2. If the speed changes are the same amounts, except reversed, then the second time interval T2 is twice the first time interval T1 (T2=2×T1). Thus, the first screw 120 is now decelerated by 50 percent and the second screw is accelerated by the same 50 percent. This moves the flights 124 back through the normal position and to the retarded position. Next, changes in speeds of the screws 120 are reversed again for a third time interval T3. If the speed changes are the same amounts just reversed, then the third time interval T3 is equal to the first time interval T1 (T3=T1). This process can be repeated a number of times and/or the screws 120 can be returned to their original speed for a delay time interval after the process or during it (e.g., between the first and second time intervals T1 and T2 for holding the screws in the advanced clocking position for delay time interval).

In any of these clocking control methods, the adjustments in clocking positions can be continuous or intermittent as may be desired to convey out all of the material and minimize fouling of the heat-exchange surfaces. Also, it will be noted that other clocking control methods can be programmed into the controller 156 to produce highly effective drying, mixing, etc. Moreover, it should be noted that the normal position as described herein is the midpoint position, but in other embodiments the normal position can be defined as any other desired position such as the ⅓ or ¼ position (one of the flights 124 is a ⅓ or ¼ the way between the opposing flighting), the advanced or retarded positions, or another position.

The normal (midpoint/180-degree apart) clocking position generally produces the best mixing and most uniform flow of the material 170 being processed. But some materials 170 cannot be conveyed (or at least not very well) with the screws 120 clocked in this position. So the variable-clocking feature broadens the range of materials 170 that can be processed. For example, variable clocking provides improved conveyance of materials 170 such as very free-flowing nylon pellets in a horizontally arranged multi-screw heat exchanger system 110, because such pellets will simply flow forward and run out the outlet end of the screws unless the void between the flights is closed.

An example method of how the variable-clocking feature can be used to process a very free-flowing material 170 will now be described. For this example, the material 170 is a clay slurry that is to be dehydrated, and the multi-screw heat-exchanger system 110 includes two screws 120 that are installed on a 10-degree inclined base 127 (upward from inlet to outlet ends; see FIG. 7) and rotated at 1.3 rpm, with the clocking set for a 12-minute cycle and the clocking-control method being one screw of fixed speed and the other screw operating at varying speeds with no delays at the advanced and retarded positions. The rate of change in the speed of the variable-speed screw 120 is non-linear and is a sine function with a relatively rapid change mid-pitch of the flighting 124, near normal clocking, and a slow increase in speed as the variable-speed flighting advances and approaches the back surface 182 of the flighting of the fixed-speed screw. The variable-speed screw 120 then begins a very slow reduction in speed to retard and move away from the fixed-screw flighting 124, increasing in speed as it traverses the mid-point of the pitch and again slowly increasing in speed as it continues retarding and approaches the front of the flighting of the fixed-speed screw. This speed change is continued repeatedly in a sine function until it the process is completed.

This method of acceleration-deceleration produces a slow final approach of the flights 124, as they near close proximity with each other in the advanced and retarded positions, with multiple revolutions of the flights during this slow final approach segment of their travel. This slow final approach of the flights 124 into the advanced and retarded positions enables the flights to abrade the flight heat-exchange surfaces 180/182 of any material 170 that had adhered to them in a pulsing pattern. In addition, as the clay in the clay slurry dries, chunks or clods 170b form and are separated from the fluid phase 170a unless the flights 124 are in close proximity, and this separation is often undesirable. The slow final approach of the flights 124 into the advanced and retarded positions also results in the flights being in or near the advanced and retarded positions for a longer time, thereby minimizing the inter-flight axial gap through which the fluid phase 170a of the clay slurry material 170 can flow backwards, and thus achieving enhanced conveyance of the entire clay slurry with reduced separation.

Having described in detail the system 110 of the first example embodiment, as well as its functioning and use, several alternative embodiments will now be described. In one alternative embodiment, there is provided a multi-screw heat-exchanger system without the controller and instead with a manual control system adapted to permit manually adjusting the screw clocking from the normal to the advanced and/or retarded positions (e.g., by manually adjusting the ASDs). This can be done manually for the same benefits of removing forward any non-conveyable materials, maximizing mixing, periodically or continuously changing the clocking to remove residual, fouling or non-conveying materials while maintaining good mixing, and/or closing the gap between the flights to convey a heterogeneous mixture of materials out of the system.

In other alternative embodiments, the multi-screw heat-exchanger system includes other components for sensing and calculating the clocking of the screws relative to each other. For example, in some such embodiments the screw-position sensors are provided by axial or radial cams mounted externally or internally on each screw and linear position sensors to sense the relative axial position of the flights.

In some other such embodiments, the screw-position sensors are provided by torque-measuring devices and additional manual or automatic-programmed controlling of the screws. For example, as one of the screws is accelerated to the advanced clocked position, its torque feedback can be measured. And the control system can be set up to advance one screw until the torque rises to a pre-set limit, retard it slightly, and then return to a constant speed and operate at that speed for a while with the screws in the advanced position. Then the control system decelerates that screw until the torque rises again to the pre-set limit, advances it slightly, and then returns to a constant speed and operates at that speed for a while with the screws in the retarded position. If the operator wishes to reclock the screws to the normal (midpoint) for maximum mixing, then the time allowed for reclocking to the normal position from the advanced and retarded positions is half the time for the whole transit between the advanced and retarded positions. The torque-measuring devices can measure the torque from the ASDs, a torque arm, etc., and the advanced and/or retarded positions sensed by a rapid rise in torque on interference of the flighting (actually, the material built-up on the flighting). If drift of the screw speed creates interference, then screw speed can be adjusted slightly. The normal midpoint position can be established by movement to a position equidistant between the positions of high torque on each end of the cycle. Thus, in this embodiment, the screw-position sensors are effectively, though not directly, detecting the rotational positions of the screws.

And in still other such embodiments, the screw-position sensors are provided by revolution counters on the actuator or another drive train component such as the drive shafts and additional manual or automatic-programmed controlling of the screws. For example, a revolution counter can be used to determine the number of screw revolutions between the normal clocking position and the advanced and/or retarded positions, and the controller programmed to vary the screw speeds between the advanced, normal, and retarded positions.

In other alternative embodiments, the control program of the control system functions to adjust the screws between a normal position and an advanced position, or between a normal position and a retarded position, but not to both an advanced and a retarded position. Such embodiments advantageously provide for restricted flow (forward or backward) of the material through the screws, though they may not be as desirable for cleaning adhered material from the front and back surfaces of the flights.

In yet other alternative embodiments, the multi-screw heat-exchanger system includes independently driven screw conveyors with a control system operable to start and stop dedicated actuators that rotationally drive the screws, but without the variable clocking feature. In some such embodiments, the system includes variable speed drives and a controller with a control program that includes a screw-interference feature. Such embodiments can include the same components as the embodiment shown in FIGS. 4-9. The elimination of the bull gears and extra bearings advantageously permits replacing the actuators and/or bearings without disturbing the precise alignment of the screws and having to then realign them. Such embodiments also greatly increase the maintenance intervals between major servicings because this design allows the screws to relieve any internal stresses, by deflection, without adverse consequences, thereby extending the life of the major components.

And in still other alternative embodiments, the multi-screw heat-exchanger system includes more than two screws with adjacent ones of the screws having overlapping flights. For example, if three screws are arranged in a row, then the center screw functions the same as one screw of the screw pairs described herein and the two outside screws function the same as the other screw. And if four screws are arranged in a row, then two non-adjacent alternate screws function the same as one screw of the screw pairs described herein and the opposing alternate screws function the same as the other screw.

It should be noted that the multiple-screw conveyor systems described herein are designed for exchanging heat with the material and mixing the material while conveying the material along. However, these systems can be adapted for applications in which only heat exchanging or only mixing is desired (in addition to conveyance). For example, in mixing-only applications, the systems are provided without components for heating or cooling the screws. And in heat-exchange-only applications, the systems can be provided with the independently driven screws but without a variable clocking feature. Accordingly, these systems are useful for numerous types of material processing that include heat exchanging, mixing, both, and/or other actions.

In addition, it should be noted that the multiple-screw conveyor systems described herein are designed for co-rotation of the screws. In alternative embodiments, the system is designed for the screws to counter-rotate or to both co-rotate and counter-rotate.

Advantageously, the present invention uses independent and/or variable-clocking drives to achieve controllable clocking of multiple overlapping screws in a screw-type heat-exchanger system to improve the conveyance of free-flowing materials, improve the conveyance and efficient heat-exchange of adhesive materials, reduce the separation of heterogeneous materials, and/or eliminate the problems associated with bull gears. The variable clocking of the screws allows for optimizing the functioning and efficiency of the screws with different feed materials and flow rates. With the elimination of the bull gears for timing, the screws can be driven with independent drives on each screw, thereby only requiring one self-aligning bearing on each end of the drive shaft.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A system for treating a material, comprising:
   first and second screw conveyors arranged in parallel, each screw conveyor having a rotary shaft and a helical flight extending radially outward therefrom, the flighting of the first screw conveyor overlapping with the flighting of the second screw conveyor; and
   first and second actuators operably coupled to the first and second screw conveyors, respectively, in a one-to-one dedicated relationship and operable to rotationally drive the screw conveyors independently of each other at a same or differing rotational speeds; and
   a control system programmed to control the actuators to variably adjust the relative rotational speed of the screw conveyors to adjust an axial position of the flights with respect to each other to thereby control a clocking position of the screw conveyors relative to each other between an advanced clocking position and a retarded clocking position and to adjust the axial position of the flights with respect to each other to prevent the overlapping flights of the screw conveyors from colliding with each other, wherein in the advanced clocking position a front surface of the flighting of the first screw conveyor is in close proximity to a back surface of the flighting of the second screw conveyor, and in the retarded clocking position a back surface of the flighting of the first screw conveyor is in close proximity to a front surface of the flighting of the second screw conveyor.

2. The screw-conveyor system of claim 1, wherein control system is further programmed to control the actuators to adjust and control the clocking position of the screw conveyors repeatedly between the advanced clocking position and the retarded clocking position in an oscillating manner to cause the material to repeatedly move between forward and rearward.

3. The screw-conveyor system of claim 1, wherein in the advanced clocking position the screws are about 270 degrees apart, and in the retarded clocking position the screws are about 90 degrees apart.

4. The screw-conveyor system of claim 1, wherein the close proximity of the front surface of the flighting of the first screw conveyor and the back surface of the flighting of the second screw conveyor in the advanced clocking position forms a dynamic traveling dam that pushes the material forward to achieve a positive transport of the material along the screw conveyors.

5. The screw-conveyor system of claim 1, wherein the control system is further programmed to control the actuators to adjust and control the clocking position of the screw conveyors by driving the first screw conveyor faster than the second screw conveyor until the advanced clocking position is reached, then driving the second screw conveyor faster than then first screw conveyor until the retarded clocking position is reached, then repeating the sequence in an oscillating manner.

6. The screw-conveyor system of claim 1, wherein the control system is further programmed to control the actuators to drive the first screw conveyor at a fixed speed and to drive the second screw conveyor at a variable speed, wherein the second screw conveyor is driven in a forward angular direction then a reverse angular direction to axially move the flights between the advanced and retarded positions.

7. The screw-conveyor system of claim 6, wherein the control system is further programmed to control the actuators to drive the second screw conveyor at a variable speed with a rate of change that is a sine function so that the rate of speed change of the second screw conveyor is smaller as the screw conveyors near the advanced and retarded positions and greater at a midpoint between the advanced and retarded positions.

8. The screw-conveyor system of claim 1, wherein the control system is further programmed to control the actuators to drive the first and second screw conveyors at a common speed but in opposite angular directions until the screw conveyors approach the advanced position, then to reverse the angular directions of the screw conveyors at the same time and drive the screw conveyors until they approach the retarded position, then to repeat the sequence in an oscillating manner.

9. The screw-conveyor system of claim 1, wherein the control system is further programmed to control the actuators to adjust the clocking position of the screw conveyors from or to a normal clocking position.

10. The screw-conveyor system of claim 1, wherein the control system is further programmed to control the actuators to drive the screw conveyors both in co-rotation, both in counter-rotation, or one in co-rotation and the other in counter-rotation.

11. The screw-conveyor system of claim 1, wherein the control system includes first and second screw-position sensors, first and second adjustable speed drives (ASDs), and a controller operated by a control program, wherein the first and second screw-position sensors are operably coupled to the first and second screw conveyors, respectively, or to the first and second actuators, respectively, and adapted to detect screw clocking positions, wherein the first and second ASDs are operably coupled to the first and second actuators, respectively, and adapted to vary the speeds of the screw conveyors, and wherein the controller communicates with the screw-position sensors and the ASDs to receive screw-position information and based thereon adjust and control the clocking position of the screw conveyors between the advanced clocking position and the retarded clocking position.

12. The screw-conveyor system of claim 1, further comprising:
   a third or more additional screw conveyors, each additional screw conveyor having a rotary shaft and a helical flight extending radially outward therefrom, the flighting of each of the additional screw conveyor overlapping with the flighting of an adjacent one of the screw conveyors; and
   a third or more additional actuators operably coupled to the third or more additional screw conveyors, respectively, in a one-to-one dedicated relationship and operable to rotationally drive the additional screw conveyors.

13. A system for thermally treating a material, comprising:
first and second heat-exchange screw conveyors arranged in parallel, each screw conveyor having a rotary shaft and a helical flight extending radially outward therefrom, the flighting of the first screw conveyor overlapping with the flighting of the second screw conveyor;
first and second actuators operably coupled to the first and second screw conveyors, respectively, in a one-to-one dedicated relationship and operable to rotationally drive the screw conveyors independently of each other at a same or differing rotational speeds; and
a control system including first and second screw-position sensors, first and second adjustable speed drives (ASDs), and a controller operated by a control program,
wherein the first and second screw-position sensors are operably coupled to the first and second screw conveyors, respectively, or to the first and second actuators, respectively, and adapted to detect screw clocking positions of the respective screw conveyors,
wherein the first and second ASDs are operably coupled to the first and second actuators, respectively, and adapted to control the actuators to vary the speeds of the respective screw conveyors,
wherein the controller communicates with the screw-position sensors and the ASDs to receive screw-position information and based thereon adjust and control the clocking position of the screw conveyors,
wherein the control system is programmed to control the actuators to variably adjust the relative rotational speed of the screw conveyors to adjust an axial position of the flights with respect to each other to thereby control a clocking position of the screw conveyors relative to each other so that the overlapping flights of the screw conveyors do not collide with each other,
wherein control system is further programmed to control the actuators to adjust and control the clocking position of the screw conveyors repeatedly between an advanced clocking position and a retarded clocking position in an oscillating manner to cause the material to repeatedly move between forward and rearward,
wherein in the advanced clocking position a front surface of the flighting of the first screw conveyor is in close proximity to a back surface of the flighting of the second screw conveyor,
wherein in the retarded clocking position a back surface of the flighting of the first screw conveyor is in close proximity to a front surface of the flighting of the second screw conveyor, and
wherein the close proximity of the front surface of the flighting of the first screw conveyor and the back surface of the flighting of the second screw conveyor in the advanced clocking position forms a dynamic traveling dam that pushes the material forward to achieve a positive transport of the material along the screw conveyors.

14. The screw-conveyor system of claim 13, wherein the control system is further programmed to control the actuators to drive the screw conveyors both in co-rotation, both in counter-rotation, or one in co-rotation and the other in counter-rotation.

15. A method for treating a material, comprising:
providing first and second screw conveyors arranged in parallel, each screw conveyor having a rotary shaft and a helical flight extending radially outward therefrom, the flighting of the first screw conveyor overlapping with the flighting of the second screw conveyor, and first and second actuators operably coupled to the first and second screw conveyors, respectively, in a one-to-one dedicated relationship;
controlling the actuators to rotationally drive the screw conveyors independently of each other at a same or differing rotational speeds to variably adjust the relative rotational steed of the screw conveyors to adjust an axial position of the flights with respect to each other to thereby control a clocking position of the screw conveyors elative to each other between an advanced clocking position and a retarded clocking position and to adjust the axial position of the flights with respect to each other to prevent the overlapping flights of the screw conveyors from colliding with each other, wherein in the advanced clocking position a front surface of the fighting of the first screw conveyor is in close proximity to a back surface of the flighting in of the second screw conveyor, or and in the retarded clocking position a back surface of the flighting of the first screw conveyor is in close proximity to a front surface of the fighting of the second screw conveyor.

16. The method of claim 15, further comprising controlling the actuators to control the clocking position of the screw conveyors between the advanced clocking position and the retarded clocking position in an oscillating manner to cause the material to repeatedly move between forward and rearward.

17. The method of claim 15, further comprising controlling the actuators to adjust and control the clocking position of the screw conveyors by driving the first screw conveyor faster than the second screw conveyor until the advanced clocking position is reached, then driving the second screw conveyor faster than then first screw conveyor until the retarded clocking position is reached, then repeating the sequence in an oscillating manner.

18. The method of claim 15, further comprising controlling the actuators to drive the first screw conveyor at a fixed speed and to drive the second screw conveyor at a variable speed, wherein the second screw conveyor is driven in a forward angular direction then a reverse angular direction to axially move the flights between the advanced and retarded positions.

19. The method of claim 18, further comprising controlling the actuators to drive the second screw conveyor at a variable speed with a rate of change that is a sine function so that the rate of speed change of the second screw conveyor is smaller as the screw conveyors near the advanced and retarded positions and greater at a midpoint between the advanced and retarded positions.

20. The method of claim 15, further comprising controlling the actuators to drive the first and second screw conveyors at a common speed but in opposite angular directions until the screw conveyors approach the advanced position, then to reverse the angular directions of the screw conveyors at the same time and drive the screw conveyors until they approach the retarded position, then to repeat the sequence in an oscillating manner.

21. The method of claim 15, further comprising controlling the actuators to drive the screw conveyors both in co-rotation, both in counter-rotation, or one in co-rotation and the other in counter-rotation.

22. A non-transitory computer-readable medium encoded with computer-executable instructions for performing the method of claim 15.

23. The screw-conveyor system of claim 1, wherein:
with a 360-degree section of the flighting of the first screw conveyor including portions overlapping with and interposed between axially-adjacent leading and trailing 360-degree sections of the flighting of the second screw conveyor, in the advanced clocking position a front surface of the flight section of the first screw conveyor is closer to a back surface of the leading flight section of the second screw conveyor than a back surface of the flight section of the first screw conveyor is to a front surface of the trailing flight section of the second screw conveyor, and in the retarded clocking position the back surface of the flight section of the first screw conveyor is closer to the front surface of the trailing flight section of the second screw conveyor than the front surface of the flight section of the first screw conveyor is to the back surface of the leading flight section of the second screw conveyor.

\* \* \* \* \*

UNITED STATES PATENT AND TRADEMARK OFFICE
CERTIFICATE OF CORRECTION

| | | |
|---|---|---|
| PATENT NO. | : 8,739,963 B2 | Page 1 of 1 |
| APPLICATION NO. | : 13/372045 | |
| DATED | : June 3, 2014 | |
| INVENTOR(S) | : Robert Nickerson and John Whitney | |

It is certified that error appears in the above-identified patent and that said Letters Patent is hereby corrected as shown below:

In the Claims:

In Claim 15:
At column 20, line number 7, delete "steed" and insert --speed--.
At column 20, line number 10, delete "elative" and insert --relative--.
At column 20, line number 17, delete "in".
At column 20, line number 18, delete "or".
At column 20, line number 20, delete "fighting" and insert --flighting--.

Signed and Sealed this
Twenty-third Day of September, 2014

Michelle K. Lee
*Deputy Director of the United States Patent and Trademark Office*